United States Patent [19]
Matsuzaki et al.

[11] Patent Number: 5,628,018
[45] Date of Patent: May 6, 1997

[54] DATA PROCESSING APPARATUS HANDLING PLURAL DIVIDED INTERRUPTION

[75] Inventors: Toshimichi Matsuzaki, Mino; Nobuo Higaki, Osaka, both of Japan

[73] Assignee: Matsushita Electric Industrial Co., Ltd., Osaka, Japan

[21] Appl. No.: 333,747

[22] Filed: Nov. 3, 1994

[30] Foreign Application Priority Data

Nov. 5, 1993 [JP] Japan .................................. 5-276756

[51] Int. Cl.⁶ .................................................. G06F 13/26
[52] U.S. Cl. .......................... 395/733; 395/737; 395/868
[58] Field of Search ................................ 395/733, 737, 395/856, 862, 868, 870, 742, 869

[56] References Cited

U.S. PATENT DOCUMENTS

| | | | |
|---|---|---|---|
| 4,332,011 | 5/1982 | Epstein et al. | 395/862 |
| 4,484,263 | 11/1984 | Olson et al. | 395/886 |
| 4,615,019 | 9/1986 | Bonci | 395/650 |
| 4,628,449 | 12/1986 | Zardiackas | 395/733 |
| 4,644,465 | 2/1987 | Imamura | 395/736 |
| 4,748,586 | 5/1988 | Bonci | 395/742 |
| 4,779,195 | 10/1988 | James | 395/869 |
| 4,796,176 | 1/1989 | D'Amico et al. | 395/863 |
| 5,119,496 | 6/1992 | Nishikawa et al. | 395/742 |
| 5,146,595 | 9/1992 | Fujiyama et al. | 395/736 |
| 5,179,704 | 1/1993 | Jibbe et al. | 395/735 |
| 5,212,796 | 5/1993 | Allison | 395/737 |
| 5,261,109 | 11/1993 | Cadambi et al. | 395/733 |
| 5,265,215 | 11/1993 | Fukuda et al. | 395/303 |
| 5,283,904 | 2/1994 | Carson et al. | 395/739 |
| 5,321,818 | 6/1994 | Wendling et al. | 395/290 |
| 5,325,536 | 6/1994 | Chang et al. | 395/733 |
| 5,481,728 | 1/1996 | Matsutani | 395/868 |

FOREIGN PATENT DOCUMENTS

| | | |
|---|---|---|
| 0048767 | 9/1980 | European Pat. Off. . |
| 0511769 | 4/1992 | European Pat. Off. . |

OTHER PUBLICATIONS

Hitachi Single Chip MicroComputer, 1989, H8/532 HD6475328, HD6435328 Hardware Manual, pp. 73–75 (with translation).

Intel Corporation, Intel 8096KB Programmer's Reference Manual, 1988, p. 7–11, p. 8–1, to p. 8–11.

Motorola Inc., MC68040 32–Bit Third–Generation Microprocessor, 1989, pp. 2–4 to 2–5, pp. 3–17 to 3–18.

NEC Corporation V Series Microprocessor Data Book, 1989, pp. 104–106 (with translation).

"Interrupt Service Allocation Technique for the Micro Channel Bus", IBM Technical Disclosure Bulletin, vol. 33, No. 1A, Jun. 1990.

Primary Examiner—Ayaz R. Sheikh
Attorney, Agent, or Firm—Price, Gess & Ubell

[57] ABSTRACT

The object of the present invention is to provide an interruption processing apparatus which allows for improvements in operational speed and offers flexibility for a variety of systems, while using a lower amount of hardware. When an interruption occurs, then for the present invention shown in FIG. 2, the corresponding interruption request flag in the interruption control register 1 in the group interruption control unit 5 is set. The interruption request unit 2 then outputs the interruption signal to the CPU 6 based on the interruption request flag. The interruption level arbitration unit 3 adjusts any conflict with other group control units and outputs, as the arbitration result, a signal showing whether output is possible or not for the interruption signal. The group number output unit 4 then outputs the fixed group number for the group in accordance with the arbitration result in response to access from the CPU 6. Once the CPU 6 receives the interruption request signal, no matter from what group interruption control unit the interruption was from, it activates the start of a program starting at the same address.

40 Claims, 17 Drawing Sheets

FIG. 5

INTERRUPTION HANDLER PROGRAM

| | SEQUENCE | ONLY ONE INTERRUPTION IN A GROUP | A NUMBER OF INTERRUPTIONS IN A GROUP |
|---|---|---|---|
| HANDLER (PRE-PROCESSING) | REGISTERS SAVED | dec2 AR3<br>mov AR0,@(AR3) | dec2 AR3<br>mov DR0,@(AR3)<br>dec2 AR3<br>mov AR0,@(AR3) |
| | GROUP NO. READ | mov @(FC0E),AR0 | mov @(FC0E),AR0 |
| | GENERATION OF ENTRY ADDRESS IN INTERRUPTION PROGRAM | add #BASE,AR0<br>mov @(AR0),AR0 | add #BASE,AR0<br>mov @(AR0),AR0 |
| | DIVERSION | jmp @(AR0) | jmp @(AR0) |
| | DETERMINATION OF INTERRUCTION IN THE GROUP | (UNNECESSARY) | mov @(INTRn),DR0<br>btst #0,DR0<br>bnz $INTn0<br>btst #1,DR0<br>bnz $INTn1<br>btst #2,DR0<br>bnz $INTn2<br>jmp $INTn3 |
| HANDLER (POST-PROCESSING) | REGISTERS RESTORED | mov @(AR3),AR0<br>inc2 AR3 | mov @(AR3),AR0<br>inc2 AR3<br>mov @(AR3),DR0<br>inc2 AR3 |

FIG. 11

| TYPE OF INSTRUCTION | IB AMOUNT WHEN CALCULATING PC | CALCULATION METHOD |
|---|---|---|
| COMPLETION TYPE | 3 | PFCP-2 |
|  | 2 | PFCP-1 |
|  | 1 | PFC-2 |
|  | 0 | PFC-1 |
| FIRST BYTE ABORT TYPE | 3 | PFCP-2 |
|  | 2 | PFCP-1 |
|  | 1 | PFC-2 |
|  | 0 | PFC-1 |
| SECOND BYTE ABORT TYPE | 3 | PFCP-3 |
|  | 2 | PFCP-2 |
|  | 1 | PFC-3 |
|  | 0 | PFC-2 |

(C)

(D)

(A)

(B)

DATA PROCESSING APPARATUS HANDLING PLURAL DIVIDED INTERRUPTION

BACKGROUND OF THE INVENTION

1. Field of the Invention

The present invention relates to a interruption handling apparatus for a microcomputer with advanced flexibility.

2. Description of the Related Art

In recent years, advances in electronics and information processing have led to improvements in the efficiency of microprocessors, and to their widespread use in machinery and appliances.

Under the prior art, interruption handling apparatuses installed in information processing devices such as microprocessors have used a method changing the starting address of the processing program for every interruption factor, otherwise known as a vector interruption method.

Under the vector interruption method, along with the assignment of the specified vector to each interruption factor, a table which corresponds starting addresses of interruption processing programs to vectors is constructed.

When interruption occurs, after waiting for the completion of the instruction currently being executed, the interruption is received. The vector for distinguishing the interruption factor is generated, the starting address of the interruption processing program corresponding to the vector is retrieved from the above table, and then the necessary control of the branching from the address of the current execution to the starting address is performed. The starting address is controlled by hardware such as a microprogram. After branching to the starting address, the interruption processing program starts. Then, once the interruption processing program has been completed, the hardware control executes the control process returning to the original program address.

Under the vector interruption method, interruption processing programs are created for each interruption factor, and the interruption processing programs for each interruption factor are activated by the hardware control by setting the address at the head of every program as a starting address in the above table. Therefore, interruption processing programs are made use of in a variety of separate circumstances.

However, under the prior art, there has been the problem of having to increase the hardware scale, so that the processes from the occurrence of the interruption to the start of the interruption processing program, and from the end of the interruption program to the return to the original program, can be carried out by hardware.

Also, although there are many kinds of systems which feature built-in microcomputers, from large scale systems to small scale systems, there has been the problem that in terms of the properties of the system, there have been insufficient improvements in operational speed and there has not been the flexibility corresponding to the properties of the system. These problems are more specifically described below.

Firstly, when controlling a switching of tasks by means of an interruption process installed in an operating system, then before initializing the interruption processing programs corresponding to the various interruption factors, it is necessary to make all of the interruption starting addresses the same. That is to say, no matter what interruption occurs, once it has been branched to the interruption processing program in the operating system. In such a case, then for the vector interruption method, the benefits of being able to change the starting addresses for every interruption factor are in no way realized. By referring to the table, there has been the problem that the speed of the process from the occurrence of the interruption to the branching to the interruption processing program has been reduced.

Secondly, regarding the interruption response time from the occurrence of the interruption to the branch to the interruption processing program, even though the reading the starting address of the interruption processing program corresponding to the vector, which is stored in the table, and the branching to that address are said to be controlled by the control hardware, since a memory read operation equivalent to indirect memory addressing of the branch instruction is necessary, then processing speed cannot be further improved and a minimal necessary execution time remains. For systems where quick response to the occurrence of interruptions is necessary, there has been the problem that there can be occasions when the start of the interruption processing program is not sufficiently quick.

Thirdly, for interruptions which do not occur at the same time as instruction execution, such as external interruptions, since they have to wait until the instruction currently being executed is complete, there has been the problem that the activation of the interruption process is delayed.

SUMMARY OF THE INVENTION

In response to the above problems, the object of the present invention is to provide an interruption processing apparatus which allows for improvements in operational speed and offers flexibility according to a variety of systems, while using a lower amount of hardware.

The above object is achieved by an interruption processing apparatus for controlling interruptions, installed in a microcomputer which contains a CPU which receives a number of interruption signals, comprising: a mask level output unit for outputting a mask level which shows an interruption level which can be received by the CPU; a plurality of group interruption control units, each receiving interruptions from I/O at its own predetermined level and outputting to the CPU; and an interruption handler initiation unit for initiating a program starting from a fixed address which processes a transfer to an interruption process, once the CPU has received an interruption signal, no matter from what group interruption control unit the interruption is received, wherein every group interruption control unit comprises: an interruption control register for storing the predetermined interruption level for a group and interruption request flags showing when each of the interruption requests in a group occurs; an interruption request unit for outputting to the CPU an interruption signal corresponding to the interruption level in the interruption control register, based on the interruption request flags; an interruption arbitration unit for adjusting conflict with other group interruption control units, based on the interruption level stored in the interruption control register and on the mask level inputted from the mask level output unit; and a group number output unit for outputting a group number predetermined for a group responding to an access from the CPU, in accordance with an arbitration result.

The interruption processing apparatus may further comprise: a handler storage unit for storing a program which selects one interruption factor out of a group and transfers to an interruption program, once an interruption signal has been inputted into the CPU and the group number has been taken from the group interruption control unit which outputted the interruption signal; wherein the interruption handler initiation unit has the program with the fixed starting address executed, once the CPU has received the interruption signal.

Every interruption control register may store enable flags showing that interruption is permitted corresponding to every interruption request flag, and every interruption request unit outputs the interruption signal to the CPU when the corresponding interruption request flag and the enable flag are both valid.

Every interruption arbitration unit may be connected in series via arbitration signal lines, and every interruption arbitration unit may further include: a mask level determination unit for determining whether the mask level outputted by the CPU and the interruption level of the interruption control register are equal; and an arbitration signal output unit for invalidating and outputting the arbitration signal from a previous interruption arbitration unit in the series, when the mask level determination unit determines that the levels are equal, and for outputting an arbitration signal from a previous interruption arbitration unit in the series as it is, when it is determined that the levels are not equal; wherein the CPU may output a group number read signal, by means of executing the program, and a first interruption arbitration unit in the series may receive the group number read signal from the CPU as the arbitration signal.

Every group number output unit may comprise a group number register for storing the predetermined group number for a group; and a group number output unit for outputting the group number stored in the group number register to the CPU, when the arbitration signal outputted by the arbitration signal output unit in the group is valid.

By means of the above construction, then since interruption factors are divided into a number of groups and a mask level is set for every group, then along a reduction in the amount of interruption processing hardware, flexibility suited to systems from large-scale to small-scale can be achieved. Moreover, since the apparatus diverts to the same program (the interruption handler) for every interruption processing request, interruption processing can be achieved at a higher speed For one of the group interruption control units, the interruption request unit may output the interruption signal to the CPU regardless of the arbitration result, when any one of the interruption request flags in the interruption control register is set.

By means of the above construction, the non-maskable interruptions can be realized by the same mounting as interruption groups which are maskable.

The interruption processing apparatus may further comprise: a first terminal for outputting a mask level from the mask level output unit; and a second terminal for outputting an arbitration result of the interruption arbitration unit in an interruption group control unit which is assigned a lowest interruption level, out of the interruption group control units which are inside the microcomputer; wherein the first terminal and the second terminal may be connected to at least one interruption group control unit external to the microcomputer having a same construction as the interruption group control unit.

By means of the above construction, interruption groups can extend outside the microcomputer, and, along with improvements in flexibility, by controlling the precharging according to the interruption permission for the program, the amount of electricity consumed when extending can be reduced.

Every interruption group control unit may further comprise: a noise elimination unit for eliminating an interruption occurrence signal which notifies that an interruption has occurred, if it is shorter than a predetermined time; and a selection unit for selecting one of the output of the noise elimination unit and the interruption occurrence signal and outputting to the interruption request flag in the interruption control register.

The selection unit may select the output of the noise elimination unit when an operation clock of the CPU is not stopped, and may select the interruption occurrence signal when the operation clock of the CPU is stopped.

By means of the above construction, since the operation of the interruption input unit changes with the state of the microprocessor's operation clocks, then it becomes possible to have a return from the stopped status of the operation clock without increasing the number of terminals.

The interruption processing apparatus may further comprise: a pointer storage unit for storing a pointer which shows the prefetch position of an instruction when an interruption is received; a prefetched amount storage unit for storing the amount of instructions prefetched when an interruption is received; and a address calculation initiation unit for initiating the microprogram for calculating a return address for a return from an interruption program, based on prefetch position of the pointer storage unit and the prefetched amount in the prefetched amount storage unit.

By means of the above construction, since the return address from an interruption is calculated from the instruction prefetch counter and the instruction prefetched amount, then the adder which calculates the execution instruction address can be omitted, and a big reduction in hardware made.

The interruption processing apparatus may further comprise: an execution status holding unit for holding information showing an end of an execution of an instruction and a decoding position of an instruction; and an interruption permission unit for showing a reception permission status of an interruption for every clock cycle corresponding to the decoding position during the execution of the instruction; wherein the interruption processing apparatus may receive the interruption at a point in time at which an interruption is permitted by the interruption permission unit, even when the information held by the execution status holding unit does not show that the instruction has ended.

By means of the above construction, since the interruption can be received so as to break off the execution of an instruction, the response to interruptions can be quickened.

The interruption processing apparatus may further comprise: a flag storage unit for storing a single step flag showing an execution of one instruction at a time; and a single step interruption request unit for outputting an interruption request at an execution of each instruction, when the single step flag is set; wherein the interruption processing apparatus may not receive the interruption during the execution of an instruction, when there is a single step flag interruption request.

By means of the above construction, the reception operation of interruptions which would break off the execution of an instruction can be stopped, and, since interruptions are not received until the execution of the instruction is complete, it becomes simple to debug the program.

BRIEF DESCRIPTION OF THE DRAWINGS

These and other objects, advantages and features of the invention will become apparent from the following description thereof taken in conjunction with the accompanying drawings which illustrate a specific embodiment of the invention. In the drawings:

FIG. 5 shows examples of interruption handler programs which connect an interruption processing program and an interrupted program;

FIG. 10B is a timing chart showing the operation of the interruption input unit;

FIG. 11 is a drawing showing the calculation method of the return address for the interruption process;

DESCRIPTION OF THE PREFERRED EMBODIMENT

Figure 1:
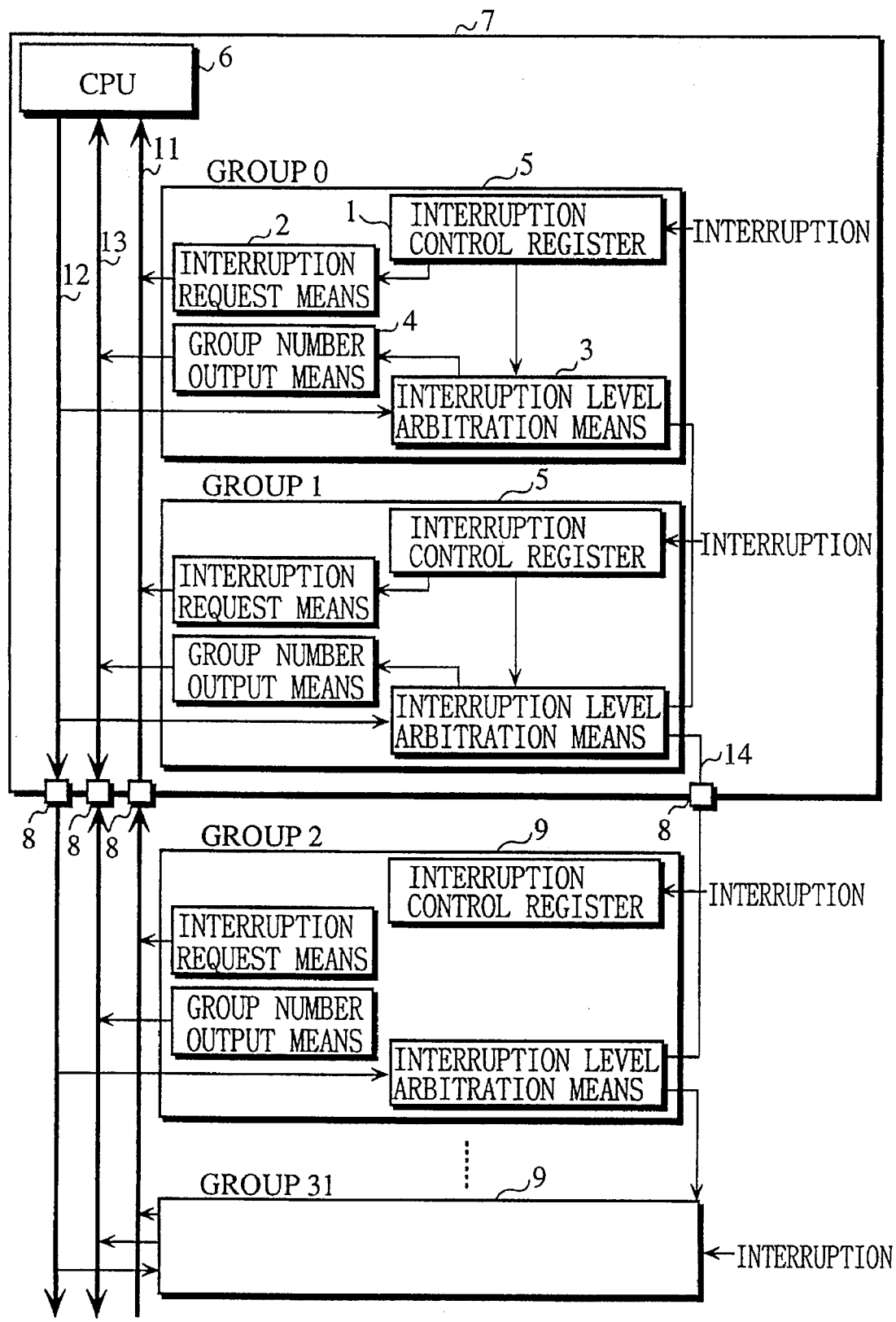
FIG. 1 is a block diagram of showing the construction of an interruption processing apparatus according to the embodiment of the present invention.

FIG. 1 is a block diagram of showing the construction of an interruption processing apparatus, and the microcomputer with which it is equipped, according to the embodiment of the present invention.

As shown in the drawing, the microcomputer 7 includes a central processing unit (hereafter abbreviated to CPU) 6 and a number of interruption group control units 5 in one chip, and is connected to a number of external interruption group control units 9 via the terminals 8.

The group of terminals 8 of the microcomputer 7 are the input/output terminals of the interruption request signal 11 which requests to interrupt the CPU 6, the mask level signal 12 which indicates to what level the CPU 6 permits interruption, the data bus 13, the intermediate result 14 of the interruption arbitration means and so on.

Each interruption group control unit 5 is constructed of an interruption control register 1, an interruption request means 2, an interruption level arbitration means 3, and a group number output means 4, and processes a maximum of 4 interruptions as a group.

The interruption control register 1 registers the interruptions from peripheral apparatuses and from outside, and indicates the permitted interruptions and interruption level.

The interruption request means 2 outputs the interruption request signal 11 to the CPU 6 in accordance with the interruption level in the interruption control register 1.

The interruption level arbitration means 3 inputs the mask level of the interruption control register 1 and the current interruption mask level signal 12 outputted by the CPU 6, and, out of the unmasked interruption levels, selects the group requesting the interruption with the highest priority value.

The group number output means 4 outputs the identity number of the group selected by the interruption level arbitration means 3 to the CPU 6 via the data bus 13.

The interruption group control units 9 are extensions of the microcomputer 7, and are constructed of the same construction elements as the interruption group control units 5 which are installed inside the microcomputer.

Figure 2:
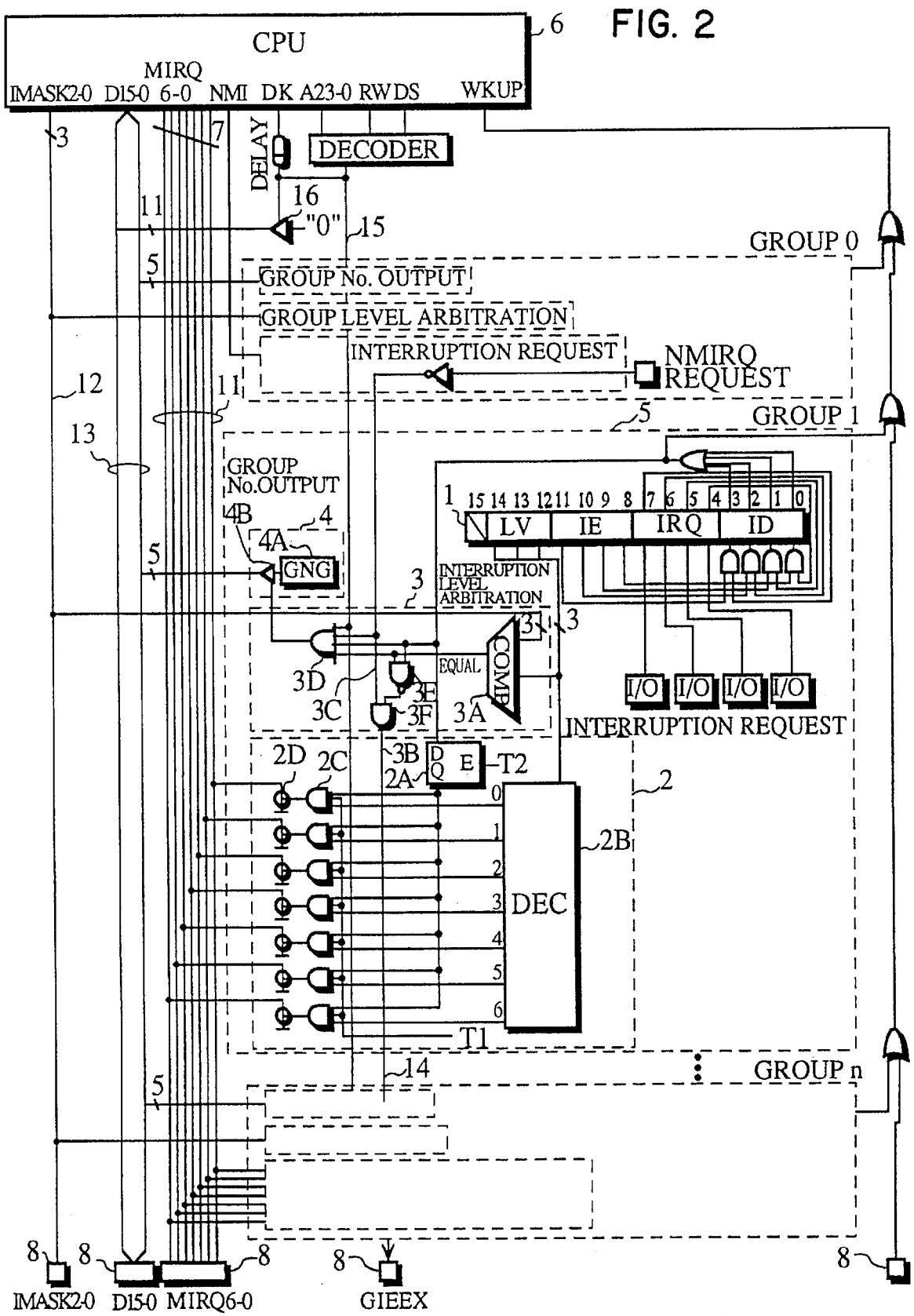
FIG. 2 is a drawing of showing the detailed construction of an interruption processing apparatus according to the embodiment of the present invention.

FIG. 2 is a block diagram showing a more detailed construction of the interruption processing apparatus shown in FIG. 1. The construction elements which have been numbered 1–8, 11–14 are the same as those shown in FIG. 1.

The interruption control register 1 contains a 3 bit LV field, a 4 bit IE field, a 4 bit IRQ field and a 4 bit ID field.

The LV field shows the interruption level of the interruption group control unit 5, with "000" being the highest level and "111" being the lowest. When the value of LV field is lower than the mask level of the CPU 6, then the interruption which occurs within the interruption group is not masked.

The IE field is composed of the interruption enable flags for each of the 4 highest interruptions received by the interruption group, with "1" showing that the interruption request is permitted.

The IRQ field are the flags registering the interruption requests and when they are "1" register an interruption request. Interruption request signals which occur in the peripheral devices such as the I/O inside or outside the microprocessor 7 are registered in the IRQ field.

The ID field is composed of the logical AND of every bit corresponding to the IE field and the IRQ field, with "1" signifying the output of an interruption request. The logical OR of every bit in this field is outputted as an interruption request to the interruption request means 2 and the interruption level arbitration means 3.

The interruption request means 2 is constructed of a latch 2A, a decoder 2B, a group of AND gates 2C and a group of drivers 2D.

The latch 2A latches the interruption request which is the logical OR of the ID field in the interruption control register 1.

The decoder 2B decodes the interruption level shown by the LV field and sets only one of its outputs, corresponding to the interruption level, as "1".

The group of AND gates 2C outputs logical AND of every output of the decoder 2B and of the interruption request of the latch 2A at the timing of the clock signal T1.

The group of drivers 2D outputs the output of the group of AND gates 2C to the CPU 6 as the interruption request signal.

The interruption level arbitration means 3 is constructed of a comparator 3A, gates 3E, 3F, and a gate 3D.

The comparator 3A compares the interruption mask level signal outputted by the CPU 6 and the interruption level of the LV register of the interruption control level register 1 and outputs an equal signal.

The groups of gates 3E, 3F output the arbitration signal 3B which, by "1", shows that interruption reception from low rank group interruption control unit is possible, based on the interruption requests from the high bank arbitration signal 3C, the equal signal, and the interruption control register 1.

The gate 3D controls the group number output of the group number output means 4.

The group number output means 4 is constructed of a group number generation unit 4A and a buffer gate 4B.

The group number generation unit 4A generates a predetermined 5 bit group number for every group.

The buffer gate 4B outputs the group number from the group number generation unit 4A to the lower 5 bits in the data bus 13. At the same time as this group number is being outputted to the lower 5 bits of the data bus 13, the buffer gate 16 outputs "0" to the higher 11 bits of the data bus 13.

Figure 3:
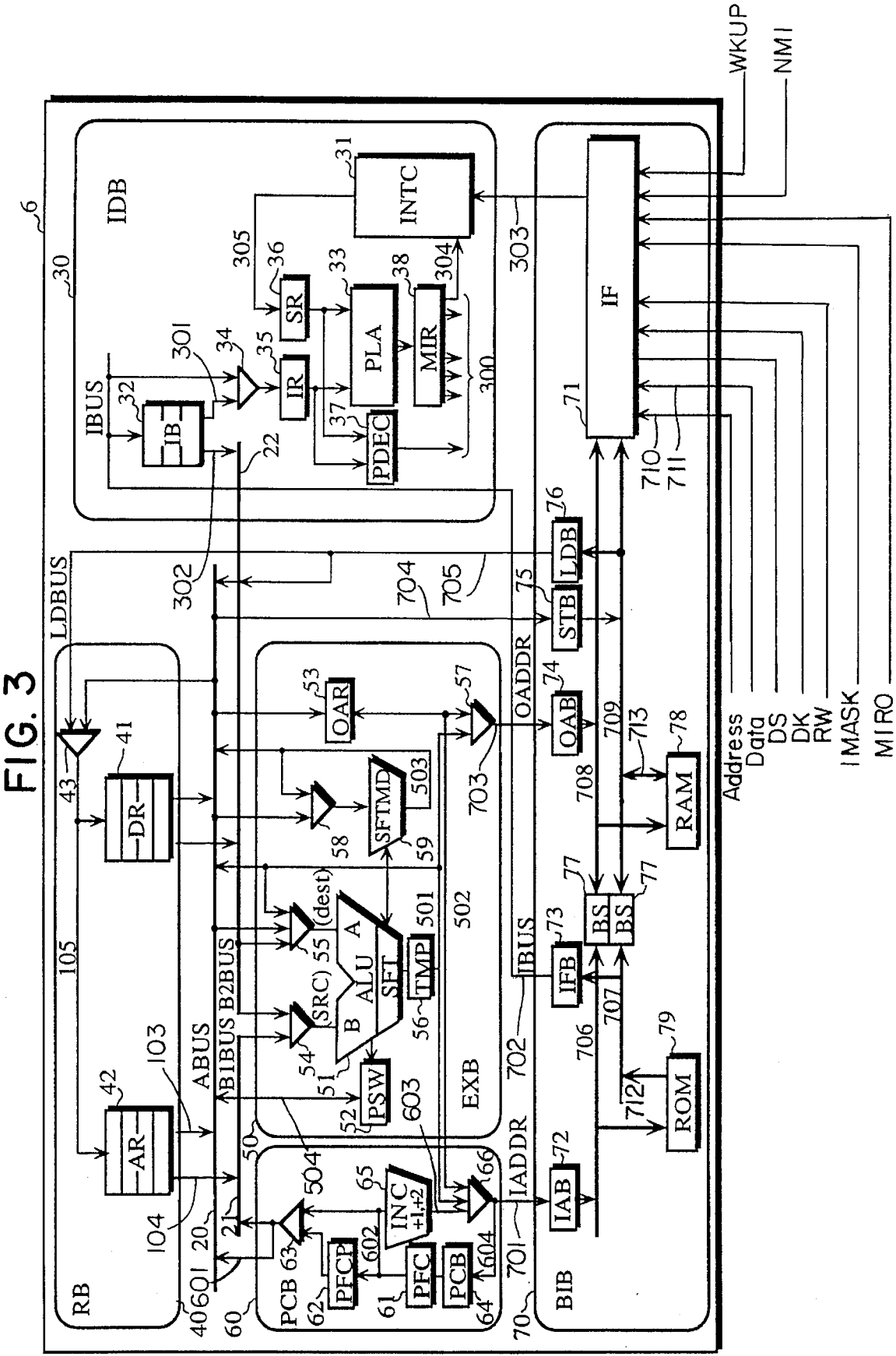
FIG. 3 is a block diagram of showing the detailed construction of the microcomputer in the interruption processing apparatus of the present invention.

FIG. 3 is a detailed block diagram showing the CPU 6 inside the microprocessor 7 installed inside the interruption processing apparatus shown in FIG. 1.

In this drawing, it can be seen that the principle components of the CPU 6 are the following 5 blocks; a instruction decoding block 30, a register block 40, a operation execution block 50, a program counter block 60, and a bus control block 70. It can also be seen that the CPU 6 is connected to the bus 20 (hereinafter referred to as the ABUS), a first data bus 21 (hereinafter the B1BUS), a second data bus 22 (hereinafter the B2BUS), an instruction address bus 701 (hereinafter the IADDR), an instruction bus 702 (hereinafter the IBUS), an operand address bus 703 (hereinafter the OADDR), a stored data bus 704 (hereinafter the STBUS), and a load data bus 705 (hereinafter the LDBUS).

The instruction decoding block 30, in order to execute the storage and decoding of the prefetched instructions and control the entire microcomputer, is constructed from a interruption control unit 31, an instruction buffer 32 (hereinafter referred to as the IB), a decoder 33, a selector 34, an instruction register 35, a status register 36, a predecoder 37, and a microinstruction register 38.

The interruption control unit 31 controls the operation sequence of the microcomputer when it receives an interruption. More precisely, once the interruption reception signal 303 has been inputted from the interface unit 71, it executes the control operation branching to the interruption handler which is the interruption control program.

The instruction buffer 32 stores the instructions prefetched from the memory in readiness their execution, having a capacity of 3 bytes of instructions.

The selector 34 selects one out of the instructions inputted from the instruction bus 702, and the instructions inputted from the instruction buffer 32.

The instruction register 35 stores the instruction outputted from the selector 34.

The status register 36 stores the all of the status flags necessary for decoding the instruction.

The decoder 33 refers to the stored content of the status register 36 and decodes the instruction in the instruction register 35. In the present embodiment, control logic is packaged by means of a microprogram using programmable logic arrays (PLA), and the microinstructions which realize instructions in the instruction register 35 are outputted in order.

The predecoder 37 inputs the content of the instruction register 35 and the content of the status register 36, and outputs the control signals to execute the main load instructions and conditional branch instructions which are operated in one cycle.

The microinstruction register 38 stores the microinstructions which are the decoded result of the decoder 33.

The register block 40, in order to store the data and the addresses, is constructed of a group of data registers 41, a group of address registers 42, and a selector 43.

The group of data registers 41 contains 4 registers, each 16 bits long, for storing the principle data.

The group of address registers 42 contains 4 registers, each 16 bits long, for storing the principle addresses.

The selector 43 selectively outputs from the ABUS 20 and the LDBUS 705 to the group of data registers 41 and the group of address registers 42.

The operation execution block 50, in order to operate the data and calculate the addresses, is constructed of an arithmetic logical unit 51, a program status word 52, an operand address register 53, a selector 54, a selector 55, a temporary register 56, a selector 57, a selector 58, and a shifter 59.

The arithmetic logical unit 51 executes the 16 bit data arithmetic and the address calculation.

Figure 7:
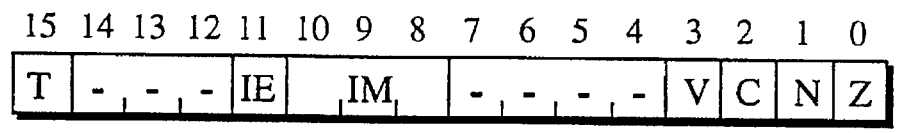
FIG. 7 shows the detailed construction of the program status word 52.

The program status word 52 is a 16 bit register for storing the operation result flags and the interruption mask level. The detailed construction of the program status word 52 is shown in FIG. 7. In this drawing, "T" shows the trace flag, which indicates for each instruction execution that a trace operation execution for single step execution of the program which is interrupted is being performed. When this flag is "1", a single step execution is performed.

"IE" is the enable flag which is the flag which permits interruption. When this flag is "1", it shows that interruption is permitted.

"IM" is the interruption mask level which indicates, out of the interruptions, to what level interruption is permitted. For example, when IM is "111", the mask level masks the 7th interruption, and receives interruptions with a mask level lower than 6. When IM is "110", the mask level masks the 7th and 6th interruptions, and receives interruptions with a mask level lower than 5. "V", "C", "N", "Z", are the operation flags and show respectively that the operation result was overflow, carry, negative, and zero.

The operand address register 53 stores the address for accessing the memory.

The selectors 54, 55 select the operands which should be inputted in the arithmetic logical unit 51.

The temporary register 56 stores the temporary output of the arithmetic logical unit 51.

The selector 57 selects one of the temporary register 56 and the operand address register 53 and outputs to the operand address buffer 74.

The selector 58 selects one of the ABUS 20 and the shifter 59.

The shifter 59 receives the output of the selector 58 and along with the arithmetic logical unit 51 performs a shift operation.

The program counter block 60, in order to control the reading position of the instruction, is constructed of a first prefetch counter 61 (hereinafter the PFC), a second prefetch counter 62 (hereinafter the PFCP), a selector 63, a program counter buffer 64 (hereinafter the PCB), an incrementor 65 (hereinafter the INC), and a selector 66.

The PFC 61 is a 16 bit long register which stores the address of the instruction which should be prefetched.

The PFCP 62 is a 16 bit long register which always stores the value of 1 cycle before the PFC 61.

The selector 63 selects one of the PFC 61 and the PFCP 62 and outputs to the ABUS 20 and the B1BUS 21.

The bus control block 70 controls the connection of the bus when accessing instructions and data to the memory, and is constructed of an interface unit 71, an instruction address buffer 72, an instruction fetch buffer 73, an operand address buffer 74, a store buffer 75, a load buffer 76, a bus switches 77, a RAM 78 and a ROM 79.

The interface unit 71 controls the connection between the bus of the CPU 6 and the external units. As shown in FIG. 2, all of the input and output signals between external units and the CPU 6 are controlled by the interface unit 71.

The instruction address buffer 72 (hereinafter the IAB), the instruction fetch buffer 73, the operand address buffer 74, the store buffer 75, and the load buffer 76 store, respectively, the instruction address, the instruction, the operand address, the store data, and the load data.

The bus switches 77 connect and disconnect the buses 706–709.

The RAM 78 and ROM 79 store the instruction and the data, respectively.

Figure 8:
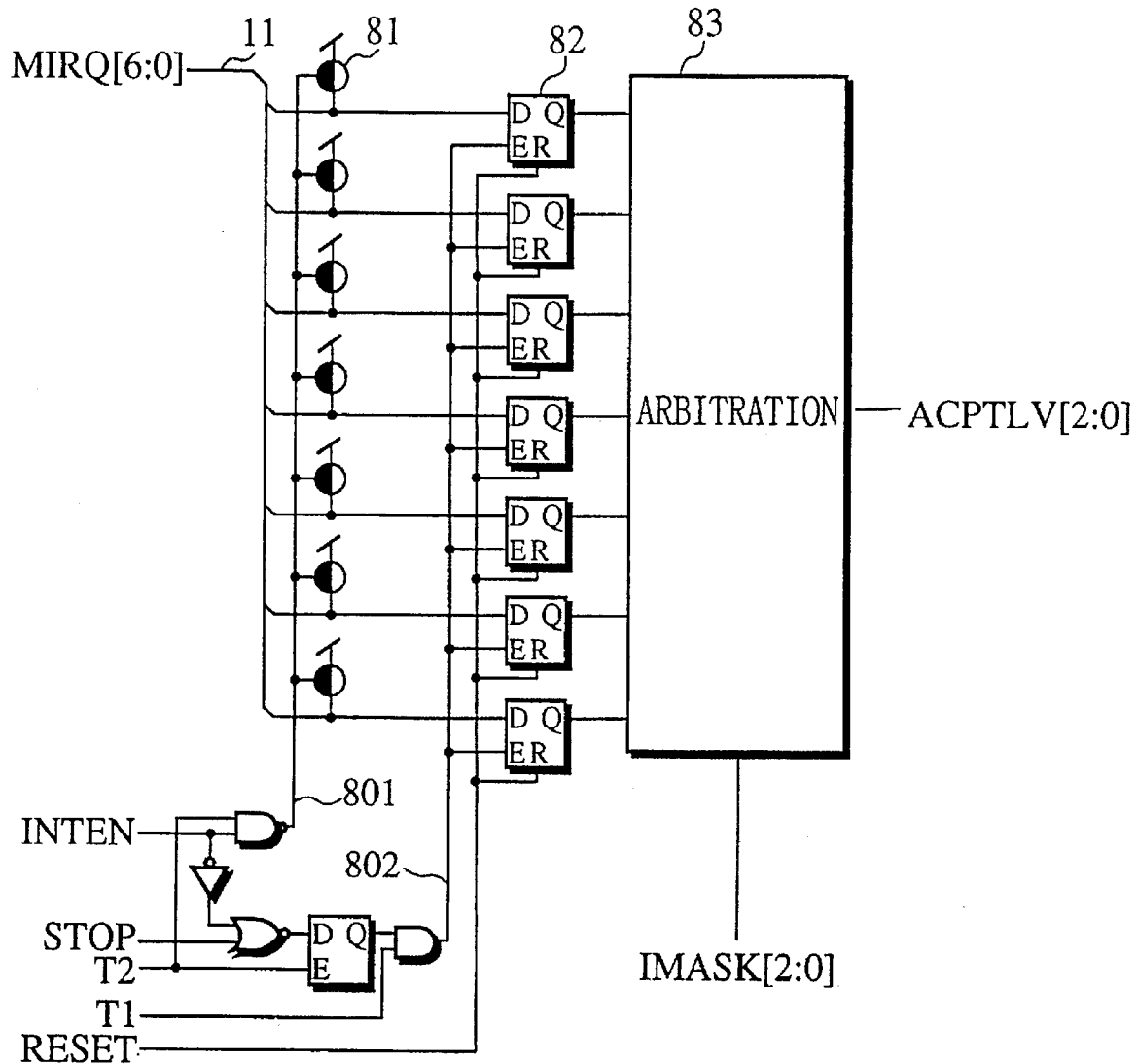
FIG. 8 is a detailed construction of the input unit of the interrupt request signal, for the interruption processing apparatus of the present invention.

FIG. 8 shows the detailed construction of the interruption input unit on receiving the interruption request signal MIRQ [6:0] in the interface unit 71 inside the CPU 6.

In this drawing, 11 is the output signal showing the level 7 interruption request signal MIRQ[6:0], while INTEN is the output signal which shows the interruption enable flag "IE" of the program status register 52 shown in FIG. 7.

STOP is the signal showing that the microcomputer's clock is in a stopped state. RESET is the signal for resetting the whole microcomputer. T1 and T2 are the operation clocks, which are 2 phase timing clocks which do not overlap each other. This interruption input unit is constructed of a group of transistors 81, a group of latches 82, an arbitration circuit 83, and a circuit covering that periphery.

The group of transistors 81 are the transistors which precharge the interruption request signal 11, which become on by means of the signal line 801 at timing T2 once INTEN has become "1" enabling the interruption. If INTEN is "1" and the microcomputer is not in a stopped state at timing T1, then the latches 82 receive the status of the interruption request line by means of the signal line 802. The outputs of the latches 82 are inputted into the arbitration circuit 83, and the interruption level with the highest interruption priority level is outputted to the ACPTLV signal. This interruption signal reception procedure is only executed when the interruption is enabled by .the signal lines 801, 802. When the interruption is not enabled, then the precharging of the interruption request signal is prohibited.

Figure 9:
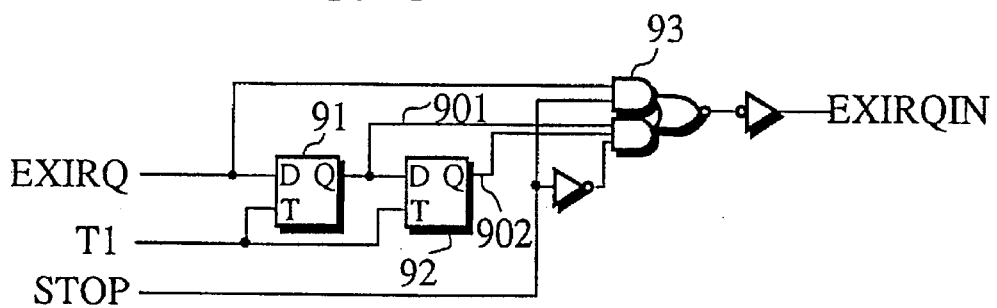
FIG. 9 is a construction showing the details of input unit for the external interrupt signal, for the interruption processing apparatus of the present invention.

FIG. 9 is a circuit diagram showing the detailed construction of the input unit of the interruption request inputted into the IRQ field of the interruption control register 1 shown in FIG. 2. This input unit is the equivalent of the components shown as I/O in the interruption group control unit 5 shown in FIG. 2, when there is an interruption request inputted from an external unit.

As shown in FIG. 9, this input unit is constructed of latches 91, 92, and a selector 93 composed of a number of gates. Here, EXIQR is the external interruption request signal inputted via the terminal. As was the case in FIG. 8, STOP is the signal showing that the clock of the is microcomputer is in a stopped state. EXIRQIN the external interruption request signal outputted by the external interruption input unit.

The latches 91, 92 receive an input at the rising edge of the clock signal T1, and synchronize EXIRQIN to the clock signal T1.

The selector 93 selects EXIRQ when the STOP signal is "1", and selects EXIRQIN synchronized to clock signal T1 by the latches 91, 92 when STOP is "0".

The above is a description of the composition of the part of the present invention, an interruption processing apparatus, which processes by means of hardware. The following is an explanation of the composition of the part which processes by means of software.

Figure 4:
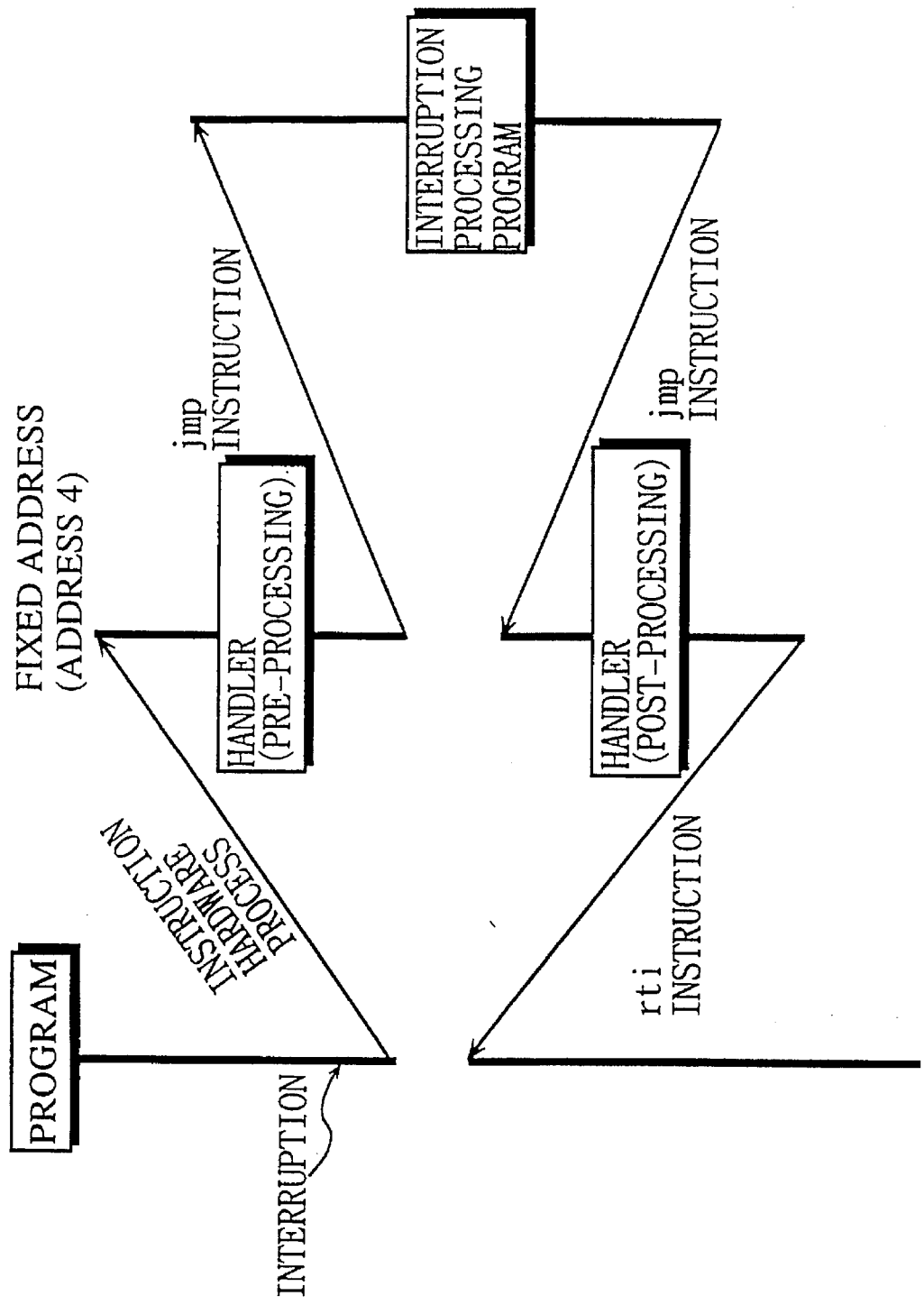
FIG. 4 is a flowchart showing process from the interruption occurrence to the return after completion of the interruption for the interruption processing apparatus of the present invention.

FIG. 4 is a flowchart for the process from the occurrence of an interruption to the return following the completion of the interruption, for the interruption processing apparatus of the present invention.

As shown in this drawing, the interruption processing apparatus of the present invention, having received an interruption, and the after the [interruption hardware process] has been executed by the hardware, branches to the determined address and initiates the program called the [interruption handler]. The interruption handler is the program which controls the connection between the interrupted program and the interrupting program, and is composed of the [pre-processing handler] which controls the transfer to the processing program for each interruption factor, and the [post-processing handler] which controls the return from the interruption processing program for each interruption factor. Once the post-processing handler has been completed, an [interruption return instruction {rti instruction}] is received, the calculation of the return address is executed by the hardware and it returns to the original program.

FIG. 5 shows an example program for the interruption handler. The pre-processing handler is composed of the execution of the following sequence; (A) a register saving process, (B) a group number reading process, (C) an interruption program entry address generation process, (D) a branch process, and (E) an interruption in the group determination process. The post-processing handler executes the sequence composed of the stage (F) Register restore process. For this interruption handler, the program when there is a maximum of 1 interruption received by the interruption group control unit 5 is different to the program when there are 2 or more interruptions. Below is an explanation following the order of the sequence given above.

(A) The register saving process

After the interruption process by the hardware, once the execution handler program has started, then first of all, the registers used in the handler are stored in the stack. For this example program, the address register AR3 used as a stack pointer is revised (dec2 AR3), and the address register AR0 used in the interruption handler is stored in the stack area (mov AR0,@(AR3)). When there are a number of interruptions in the group, then in the same way the data registers are also stored by (dec2 AR3, mov DR0,@(AR3)).

(B) The group number reading process

Next, in order to know from which interruption group the interruption is, by reading a specified address, the group number for the interruption group control unit 5 which has received an interruption request is loaded from the group number output means 4. For the example program, it reads the content of the group number output means 4 assigned to the specified address FCOE into the address register AR0 (mov @(FCOE),AR0).

(C) The interruption program entry address generation process

Next, it calculates the address in the table where the entry address of the processing program for every interruption group is written, and loads the content of the table indicated by that address. The calculation of the address in the table is executed by adding the previously read interruption group number to the base address showing the top of the table. For the example program, the group number in AR0 is added to the base address #BASE (add #base, AR0), and the table is read (mov @(AR0),AR0).

(D) Branch process

It then branches to the address read from the table. For the example program, it branches to the address shown by the address register AR0 (jmp@(AR0)). When the interruption group which requests the interruption receives only a maximum of 1 interruption, then, since the loaded content is the entry address in the interruption processing program, then the process of the pre-processing handler is hereby complete.

(E) The determination of the interruption in the group process

When the interruption group which requests the interruption receives 2 or more interruptions, then in order to know which interruption out of the number of interruption factors in the group, it reads the interruption control register 1, checks the ID field, and branches to the interruption processing program corresponding to the various bits. For the example program, then it reads the interruption control register 1 corresponding to the interruption level (mov @(INTRn),DR0), tests whether the bit 0 in the ID field (btst #0,DR0), and, if it is not 0, branches to the interruption program of that interruption factor (bnz $INTn0), while if it is 0, judges whether there has been interruption for the bits 1–3 in the ID field.

In this way, the pre-processing handler branches to an interruption processing program with the objective of executing a two-stage branch, when the maximum number of interruptions received by the interruption group control unit 1 is 2 or more. When the maximum number of interruptions is 1, the transfer to the object interruption processing program is carried out by means of a one-stage branch process.

(F) Register restore process

The register restore process restores the original content of the registers used in the interruption handler from the stack. For the example program, the address register used by the interruption handler is returned from the stack (mov @(AR3),AR0), and revises the address register AR3 used as a stack pointer (inc2 AR3). When there are a number of interruptions in the group, then in the same way the data register DR0 is also saved (mov @(AR3),DR0, inc2 AR3).

FIG. 11 is a drawing showing the calculation method of the return address by the hardware executing the [interruption return instruction (rti instruction)] which was shown in FIG. 4. The execution of this rti instruction is executed in the same way as execution of other instructions by the microprogram control in the decoder 33 shown in FIG. 3, in the operation execution block 50 and the program counter block 60 also shown in FIG. 3.

In FIG. 11, the column labelled [Type of interruption] shows that there are 3 types of instruction which can be being executed when the interruption is received. For the present embodiment, these types of instruction are for when the microcomputer 7 has an instruction whose instruction code is composed of 1 or 2 bytes, or when displacement and immediacy, or suchlike, continue after the instruction code as an operand.

[Completion Type] interruption is when the interruption processing is executed after the execution of the instruction which was being carried out when the interruption was received has been completed. In this case, the return address becomes the address of the instruction following the instruction which was being executed at the time of the interruption.

[Abort Type] interruption is when the interruption processing is carried out without completing the execution of the instruction and instead cuts off the instruction during its execution. There are two types of abort type interruption, with these being [First Byte Abort Type] which receives the first byte of instruction code during processing, and [Second Byte Abort Type] which receives the second byte of instruction code during processing. Under abort type interruption, on returning from the interruption, the instruction which was cut off during execution is once again executed. The return address saved in the stack when the interruption is received is calculated in regard to the type of interruption that is made.

The column labelled [IB amount when calculating PC] shows the amount (number of bytes) of the prefetched instructions in the instruction buffer 32 when calculating the return address during the interruption process.

PFC and PFCP in the column [Calculation Method] are the prefetch instruction counter register 61 shown in FIG. 3, and the register 62 which stores the value of the previous cycle of the same prefetch instruction counter, also shown in FIG. 3. More precisely, the calculation is executed by the microprogram control and consists of subtracting a constant of between one and three from the value stored in either the PFC 61 or the PFCP 62 in the arithmetic logical unit 51 in the operation execution block 50 shown in FIG. 3. The result of this calculation is stored in PCB 64 via the selector 66 in the program counter block 60.

The following is an explanation of the operation of the interruption processing apparatus constructed in the manner described above, according to the embodiment of the present invention.

For convenience of explanation, the operation which is executed between the occurrence of an interruption and the return to the original program, once the interruption processing program has been executed, will be divided up as follows; (1) input of interruption, (2) interruption hardware process, (3) pre-processing handler, (4) postprocessing handler, and (5) return process. Out of these, (1), (2) and (5) are hardware processes, while (3) and (4) are software processes.

(1) Input of Interruption

Figure 10:
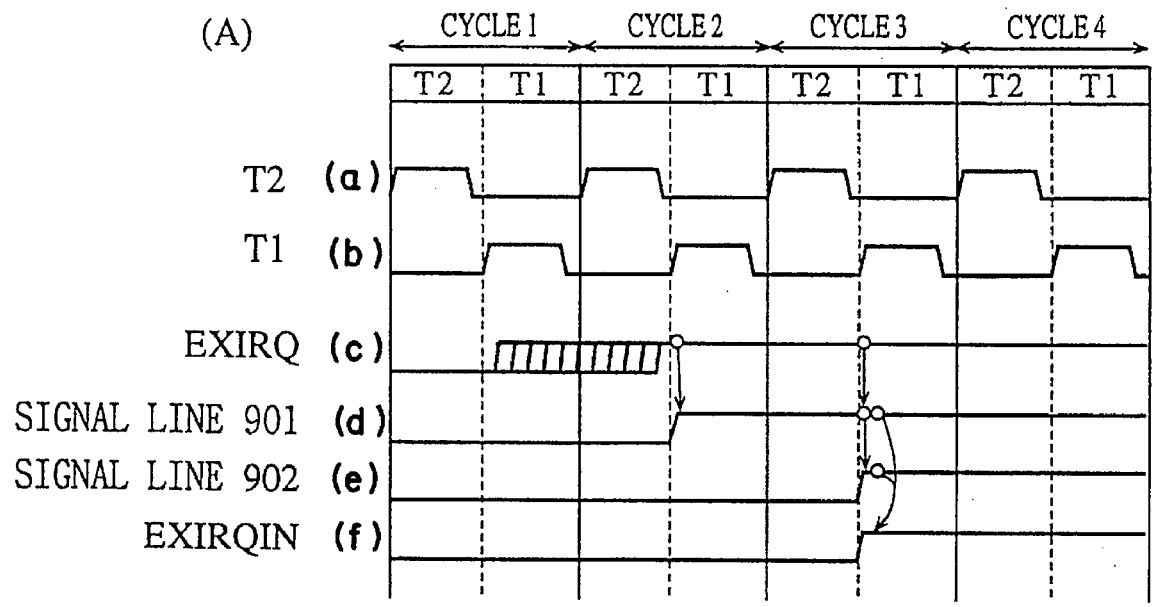
FIG. 10 comprising FIG. 10A
Figure 10:
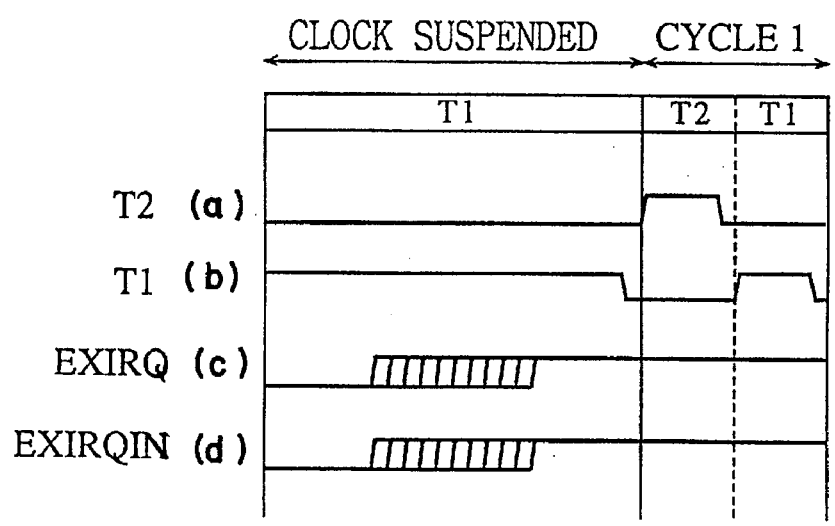

Once an interruption has occurred in the peripheral devices which are the same as I/O shown in FIG. 2 or from outside the microcomputer, an interruption request is inputted into the interruption input unit shown in FIG. 9. The timing of the operation of the interruption input unit is shown in FIGS. 10A and 10B. FIG. 10A shows the operation when the STOP signal is "0", indicating that the operation clock is not in a stopped state. FIG. 10B shows the operation when the STOP signal is "1", indicating that the operation clock is in a stopped state.

As shown in FIG. 10A, when the STOP signal is "0", external interruption request EXIRQ is a range shown by diagonal shading, and when it changes from "0" to "1", at the rising edge of T1 in cycle 2, then the signal line 901 outputted from the latch 91 in FIG. 9 changes.

Also, at the rising edge of T1 in cycle 3, at the same time as the state of the signal line 901 is latched by the latch 92, latch 91 again takes the interrupt signal EXIRQ. The signal line 902 outputted from the latch 92 also changes from "0" to "1" at the rising edge of T1 in cycle 3. When both signal line 901 and signal line 902 are "1", then EXIRQIN becomes "1". When EXIRQIN becomes "1", then the corresponding bits in the IRQ field of the interruption control register 1 shown in FIG. 2 are set, and the interruption request is received by the interruption control register 1.

If EXIRQ becomes "0" before the rising edge of T1 in cycle 3, then signal line 901 becomes "0" at the rising edge of T1 in cycle 3. Therefore, if EXIRQ is "1" for a period of 1 cycle or less, EXIRQIN does not change.

In this way, at the same time as outputting the interruption signal EXIRQ, which is not originally synchronized to the microcomputer clocks T1 and T2, so it is synchronized to T1, the interruption input unit removes any unwanted effects EXIRQ can have on EXIRQIN of 1 cycle or less caused by noise or suchlike.

As shown in FIG. 10B, the microcomputer clock is T1 when the STOP signal is "1" indicating that the operation clock is in a stopped state. At this time, the external interruption request EXIRQ is a range shown by diagonal shading, and when it changes from "0" to "1", then the selector 93 selects EXIRQ and outputs it to EXIRQIN. When EXIRQIN becomes "1", then the corresponding bits in the IRQ field of the interruption control register 1 shown in FIG. 2 are set, and the interruption request is received by the interruption control register 1. Also, if the corresponding bit in the IE field is "1", then the corresponding bit in the ID field becomes "1", and "1" is inputted into the WKUP terminal of the CPU 6 via the cascade-connected OR gates from every interference group control unit 5 shown in FIG. 2. Since the WKUP terminal is the input terminal indicating the restart of the clock, then the operation of the timing clocks T1, T2 is restarted. In reality, it is once the timing clocks have started their operation that CPU 6 receives the interruption.

(2) Interruption Hardware Process

In (1), the interruption request is registered in the IRQ field of the interruption control register. Once the IE field corresponding to every bit in the IRQ field is enabled, then the output of the latch 2A of the interruption request means 2 shown in FIG. 2 becomes "1" at the timing clock T2.

Meanwhile, the content of the LV field of the interruption control register 1 is inputted into the decoder 2B, and, corresponding to that value, one of the outputs from 0 to 6 becomes "1". Therefore, by means of the AND gate out of the group of AND gates 2C connected to the output of the decoder 2B which is "1", one of the drivers out of the group of drivers 2D is driven at the timing clock T1. By means of this driver, one of the interruption request signals 11 becomes "1".

The interruption request signal 11 is inputted into the arbitration circuit 83 via the group of latches 82 at the timing T1 in the CPU 6 as shown in FIG. 8. The arbitration circuit 83 compares the present interruption mask level and the inputted interruption request level, receives the interruption which the highest priority value out of the interruptions which are unmasked, outputs the reception signal ACPTLV [2:0] showing the received interruption level, and, along with establishing the interruption mask following that level, outputs the interruption level to the signal line 12.

Additionally, having saved the return address and the program status in the stack on receiving the interruption, the CPU 6 branches to the interruption pre-processing handler at the fixed address (for example, address 4).

(3) Pre-Processing Handler

The pre-processing handler executes a sequence composed of the previously described stages; (A) a register saving process, (B) a group number reading process, (C) an interruption program entry address generation process, (D) a branch process, and (E) an interruption in the group determination process. The details of the above process for the example program in FIG. 5 have already been explained, so, instead, the following is a detailed explanation of the operation of the row of interruption group control units 5, for the operation of (B) executed by the load request (MOV @(FCOE), AR0).

The CPU 6 accesses the previously fixed address, that is to say, the address (FCOE), which is commonly assigned to every interruption group control unit 5. This address is decoded by the DECODER in FIG. 2, and the read group number reading 15 is outputted. The interruption arbitration means 3 of the group control which requested the interruption compares the interruption mask level 12 outputted from the CPU 6 and the interruption level in the interruption control register 1 by means of the comparator 3A, and outputs an equal signal. Once the interruption mask level outputted by the CPU 6 and the interruption mask level established by the interruption group control are equal, the interruption arbitration means 3 informs, by means of the arbitration signal 3B, the interruption groups having lower priority values than that group that their interruptions cannot be received. If the arbitration signal 3C from the interruption group having a high priority value is "1", then the gate 3D becomes on, and the group number decided beforehand by the group number generation unit 4A in the group number output means 4 outputted to the data bus 13. The CPU 6 receives the group number from the data bus 13 and stores it in the address register AR0.

(4) The Post-Processing Handler

The post-processing handler executes the (F) register restore process described above. Since the details of its operation for the example program in FIG. 5 have already been described, no further explanation will be given.

(5) Return Process

Once the post-processing handler is complete, when the [interruption return instruction (rti)] is executed, the return address is calculated by the hardware.

FIGS. 12–15, 16–19 and 20–23 are all timing charts which show the operation pipeline for completion type interruption, first byte abort interruption, and second byte abort interruption, respectively. (A), (B), (C), (D) show the pipeline operation timing when, in calculating the return address, the number of instructions stored in the instruction buffer is 3, 2, 1, and 0, respectively. In every chart, IB shows the instruction buffer 32, IR the instruction register 35, and IBCN the number of requests stored in the instruction buffer 32. Also, the areas of diagonal shading show the information used by the timing when calculating the return address. In the charts, (LD @AR) shows the load instruction for indirect addressing by the address register, first for the first byte out of a 2 byte code instruction and then for the second byte out of a 2 byte code instruction. Also, RR-2 shows the instructions whose execution requires 2 or more cycles.

The following is an explanation of the operation based on every timing chart.

Figure 12:
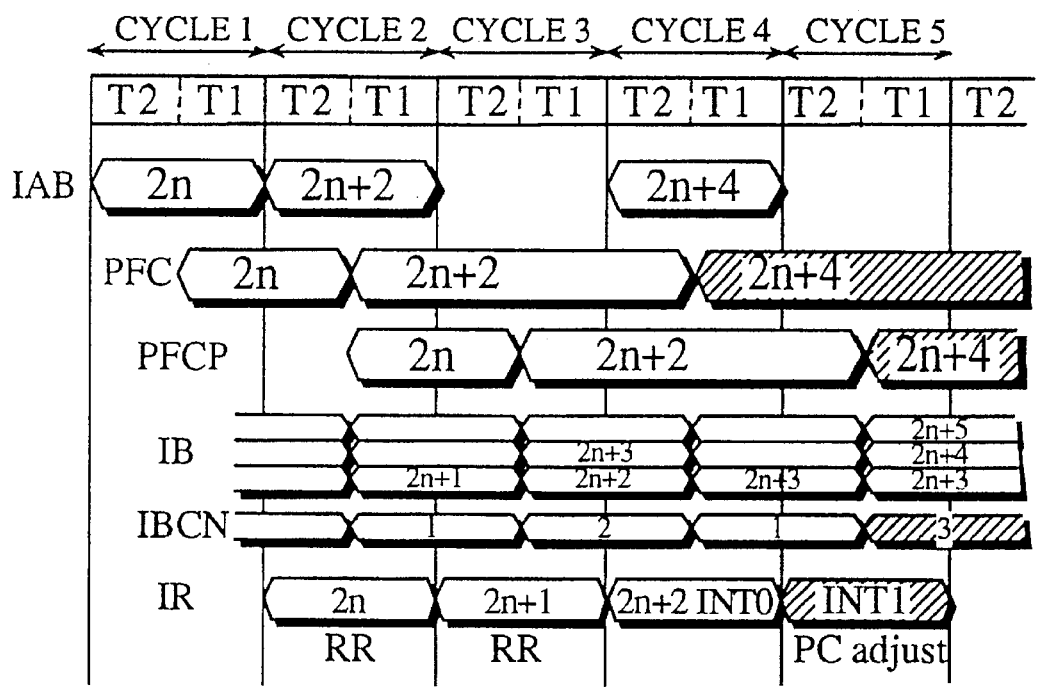
FIG. 12 is a timing chart showing the pipeline operation when the number of instructions for the instruction buffer is 3, under completion type interruption.

FIG. 12 is a pipeline operation drawing for when the number of instructions in the instruction buffer under completion type instruction is 3. In cycle 1, a 2 byte instruction is fetched from the address 2n, the instruction from address 2n is stored during cycle 2 in the instruction register IR, and the instruction of address 2n+1 is stored in the instruction buffer at timing T1 in the cycle 2. Subsequently, during cycle 2 the number of instructions stored in the instruction buffer becomes 1, and since there is still storage space in the instruction buffer, it fetches the 2 byte instruction from the address 2n+2.

Meanwhile, once the instruction at address 2n is set as the operation between the registers and the execution of the instruction has been completed during cycle 1, the transmission of the instruction at the address 2n+1 from the instruction buffer to the instruction register is executed in cycle 3. Also, since a 2 byte instruction was fetched and saved in the instruction buffer during cycle 2, then the recovered 2 byte instruction is saved in cycle 3. Since only 1 byte is left unused in the instruction buffer, an instruction is not fetched in cycle 3.

Once the instruction at address 2n+1 is set as the operation instruction between the registers in the same way as cycle 2, then the transmission of the instruction at the address 2n+2 from the instruction buffer to the instruction register is executed in cycle 4, but, once the interruption occurs during the decoding of the operation instruction between the registers in cycle 3, then the initial values of the interruption process sequence are set in the status register 36. The command for calculating the return address from the interruption is then decoded in the second cycle of the interruption process sequence (cycle 5). At this time, the content of both PFC and PFCP is 2n+4 and the number of instructions stored in the instruction buffer is 3. Therefore, the return address is calculated according to the calculation method for completion type interruption when the stored amount in the instruction buffer is 3 which is given as (PFCP-2) in FIG. 11, with a result of 2n+4−2=2n+2. Since 2n+2 is the address with follows the instruction 2n+1 , then the return address can be seen to have been correctly calculated.

Figure 13:
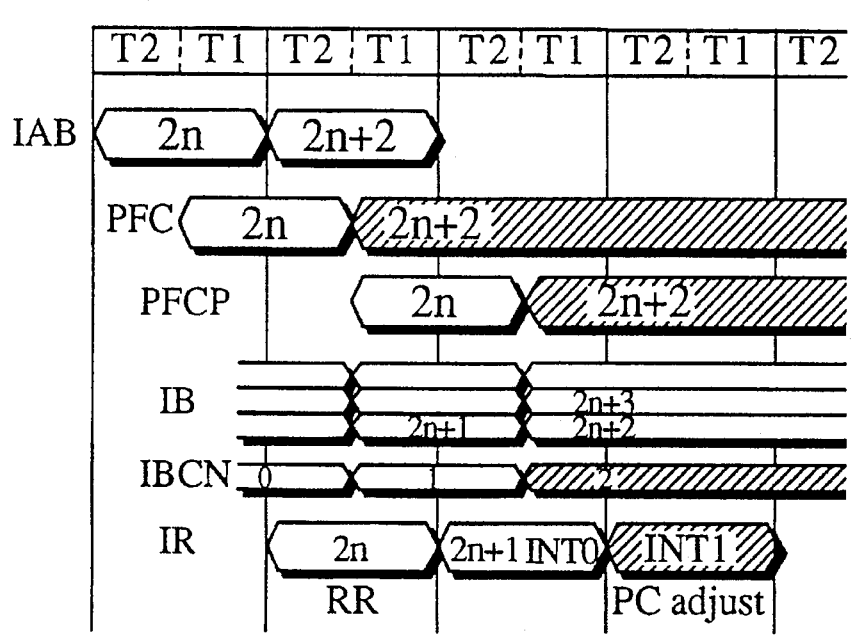
FIG. 13 is a timing chart showing the pipeline operation when the number of instructions for the instruction buffer is 2, under completion type interruption.
Figure 14:
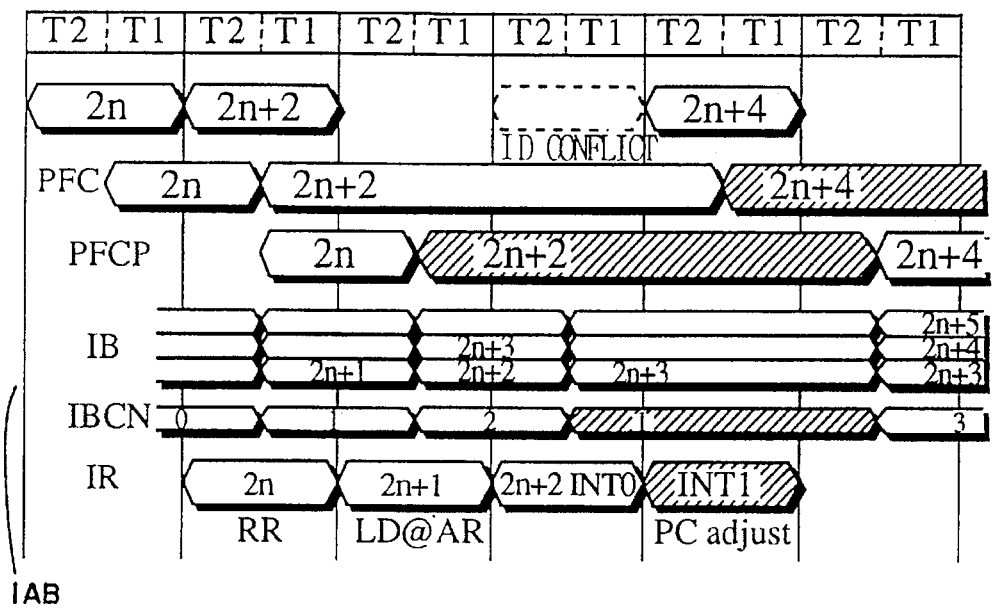
FIG. 14 is a timing chart showing the pipeline operation when the number of instructions for the instruction buffer is 1, under completion type interruption.
Figure 15:
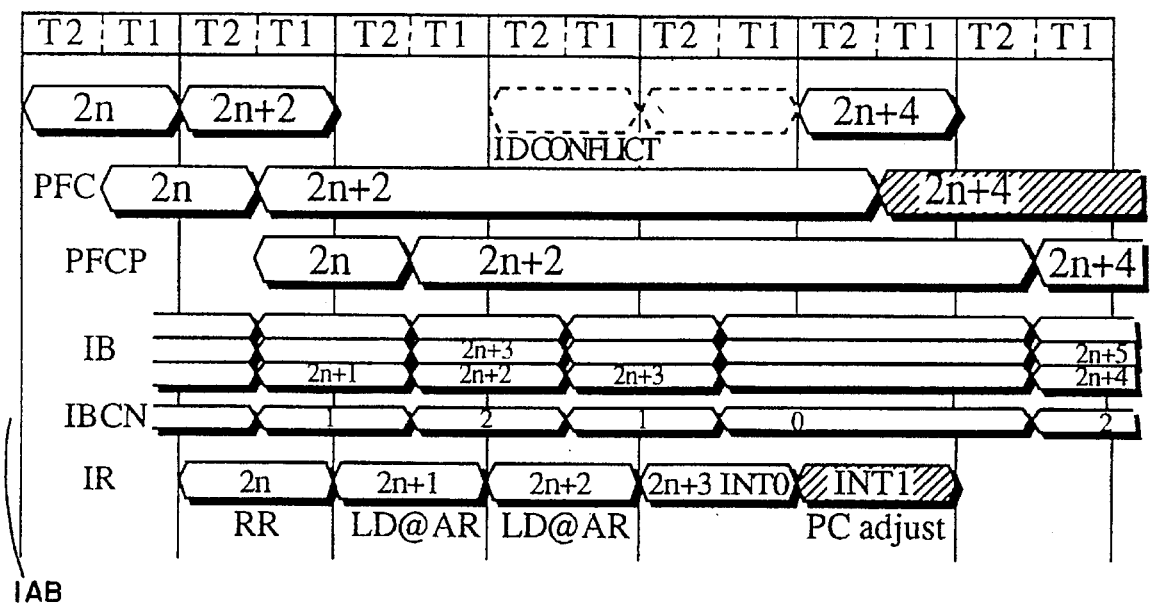
FIG. 15 is a timing chart showing the pipeline operation when the number of instructions for the instruction buffer is 0, under completion type interruption.
Figure 16:
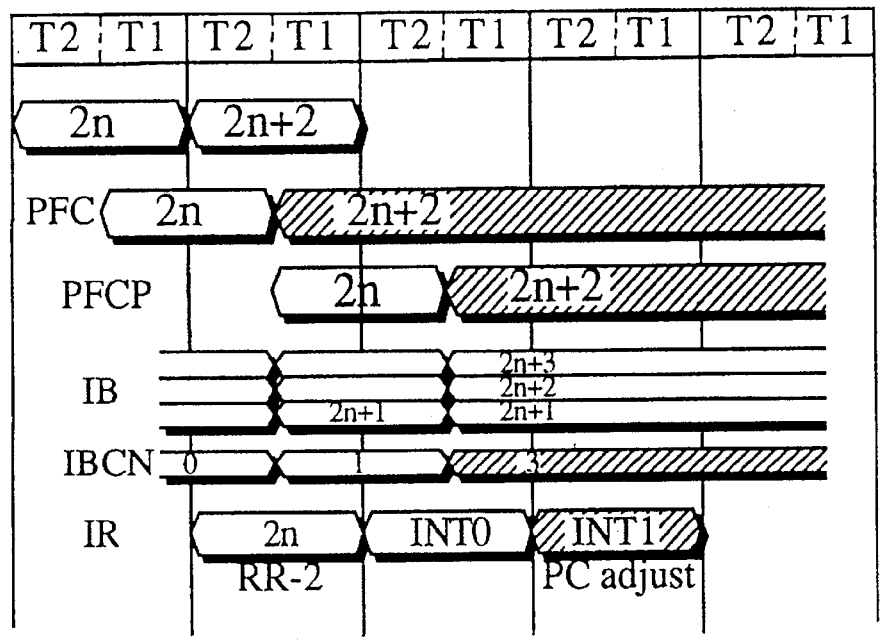
FIG. 16 is a timing chart showing the pipeline operation when the number of instructions for the instruction buffer is 3, under first byte abort type interruption.
Figure 17:
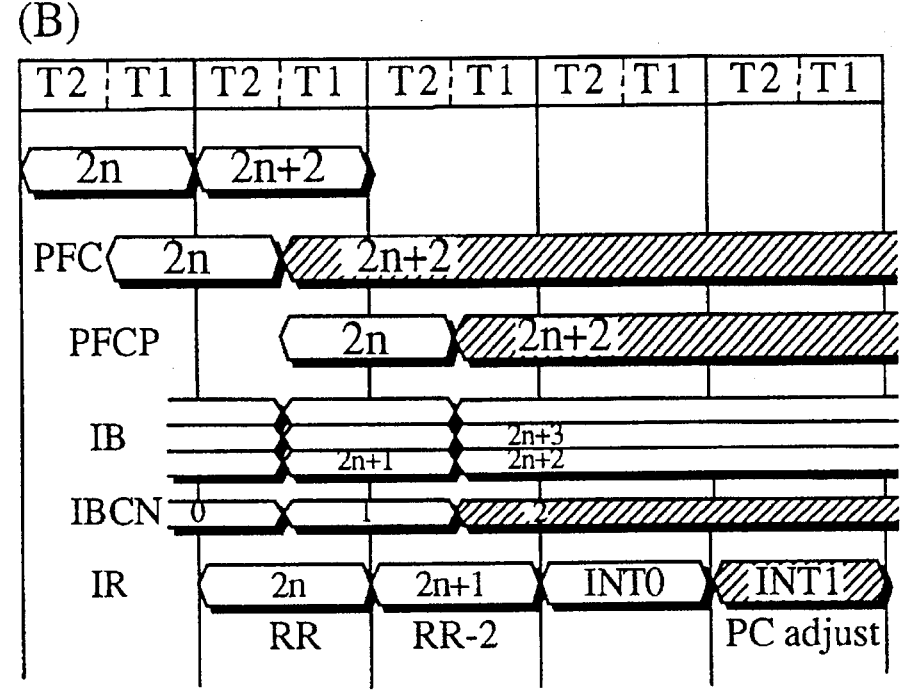
FIG. 17 is a timing chart showing the pipeline operation when the number of instructions for the instruction buffer is 2, under first byte abort type interruption.
Figure 18:
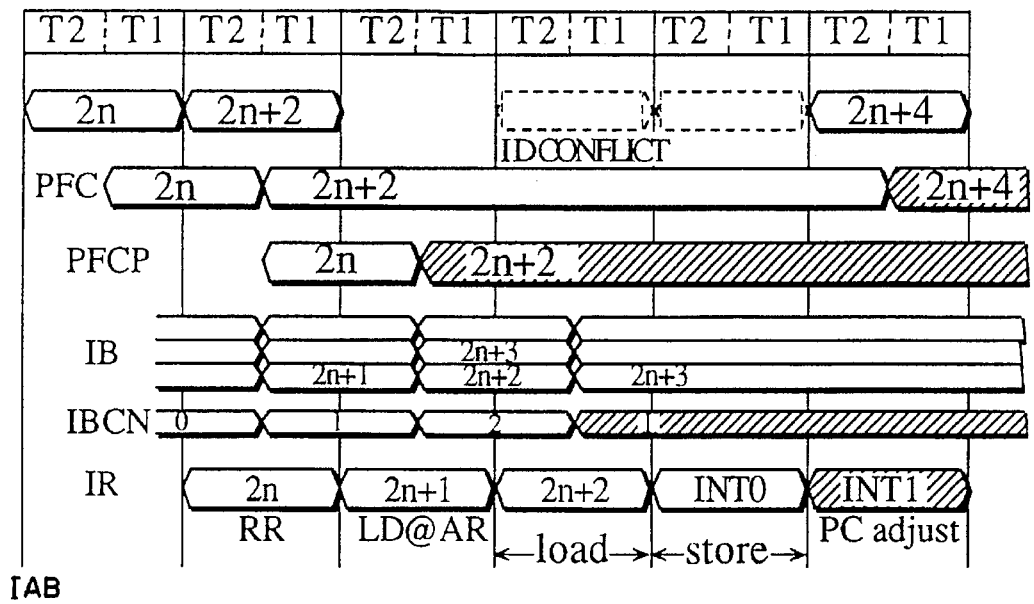
FIG. 18 is a timing chart showing the pipeline operation when the number of instructions for the instruction buffer is 1, under first byte abort type interruption.
Figure 19:
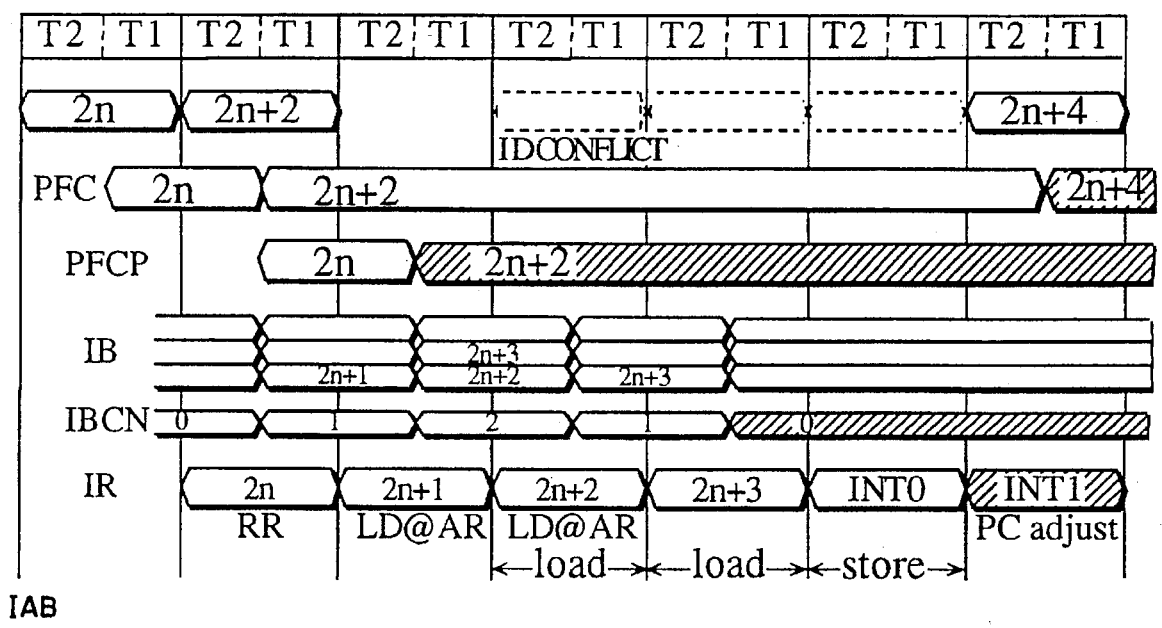
FIG. 19 is a timing chart showing the pipeline operation when the number of instructions for the instruction buffer is 0, under first byte abort type interruption.
Figure 20:
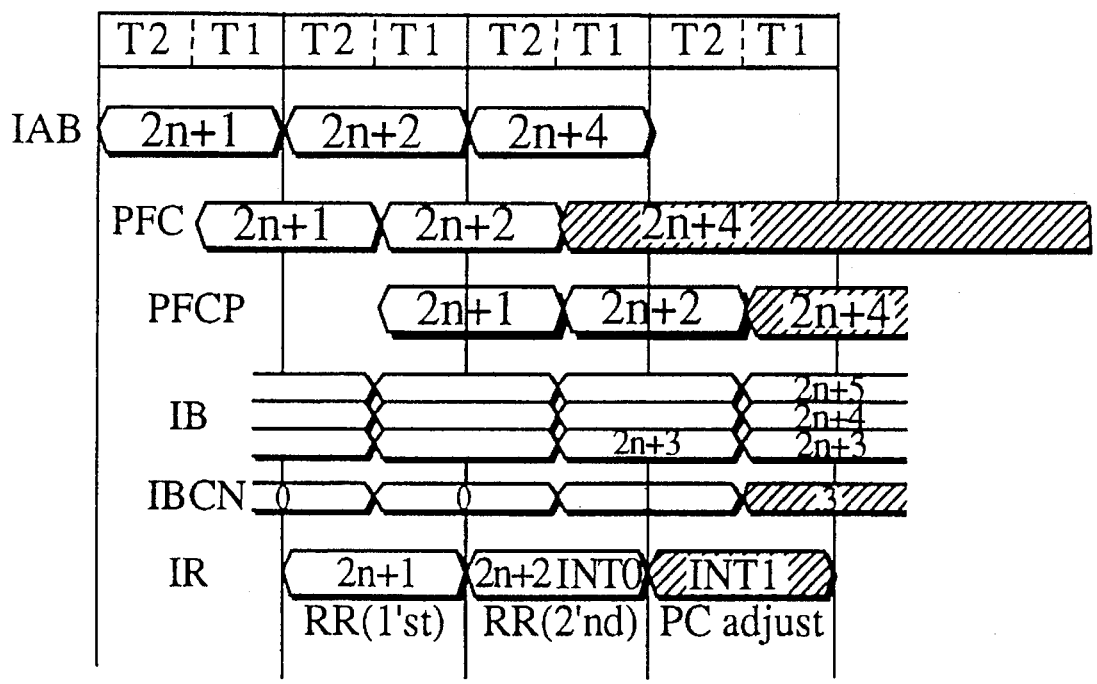
FIG. 20 is a timing chart showing the pipeline operation when the number of instructions for the instruction buffer is 3, under second byte abort type interruption.
Figure 21:
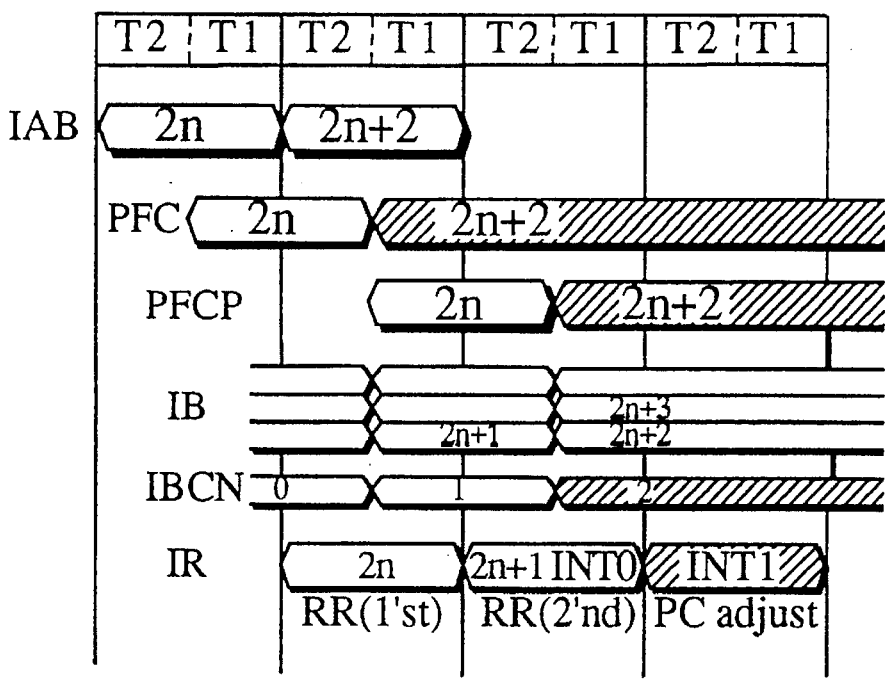
FIG. 21 is a timing chart showing the pipeline operation when the number of instructions for the instruction buffer is 2, under second byte abort type interruption.
Figure 22:
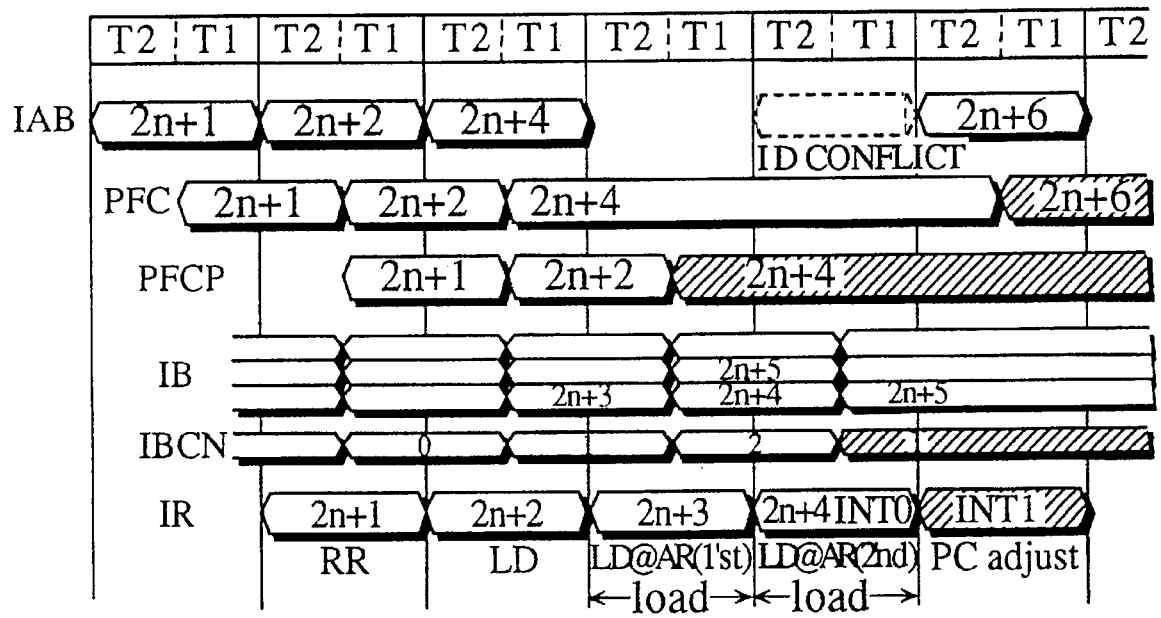
FIG. 22 is a timing chart showing the pipeline operation when the number of instructions for the instruction buffer is 1, under second byte abort type interruption.
Figure 23:
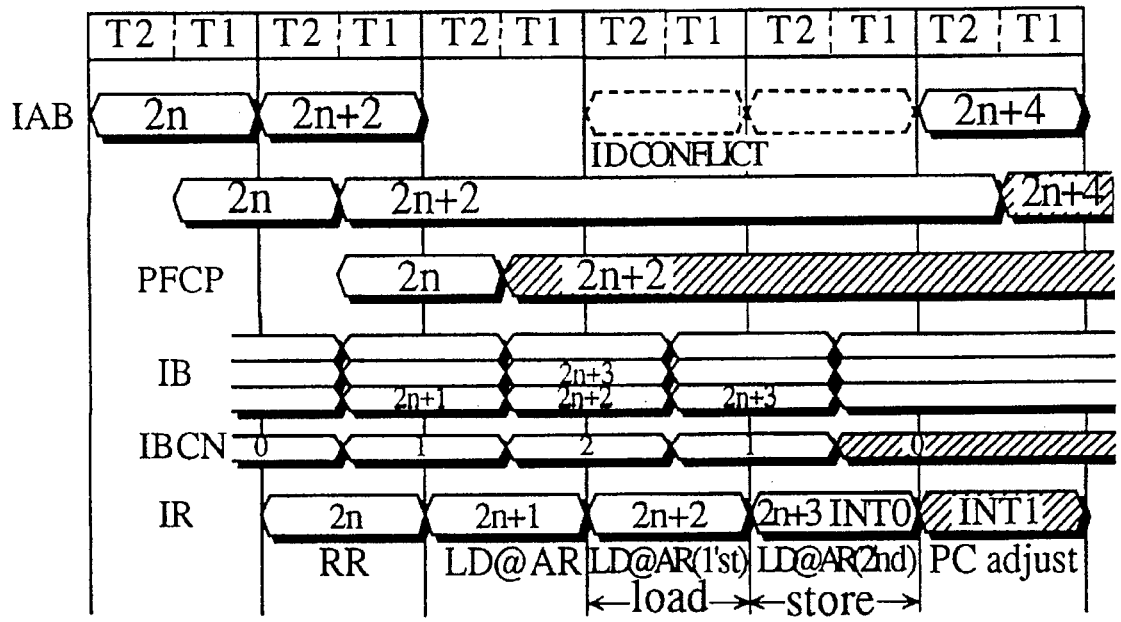
FIG. 23 is a timing chart showing the pipeline operation when the number of instructions for the instruction buffer is 0, under second byte abort type interruption.

When calculating the return address when the stored amount in the instruction buffer is 2, 1, or 0, then the calculation is performed in the same way as shown by the content of the diagonally shaded areas in FIGS. 13 through 15. In FIGS. 14 and 15, the areas IAB marked by a dotted line are the requests for instruction prefetching, and show that, since the bus is being used by a load instruction, the prefetching of the instruction cannot be performed. Since the operation is the same as for FIG. 12, no explanation has been made, nor has any for FIGS. 16–23.

All the charts show the calculation of the return address can be achieved according to the calculation methods shown in FIG. 11.

By means of the returning to the address calculated in this way, it is possible to return from the interruption to the execution status of the original program.

The following is an explanation of the operation of the interruption process under the trace status.

Figure 24A:
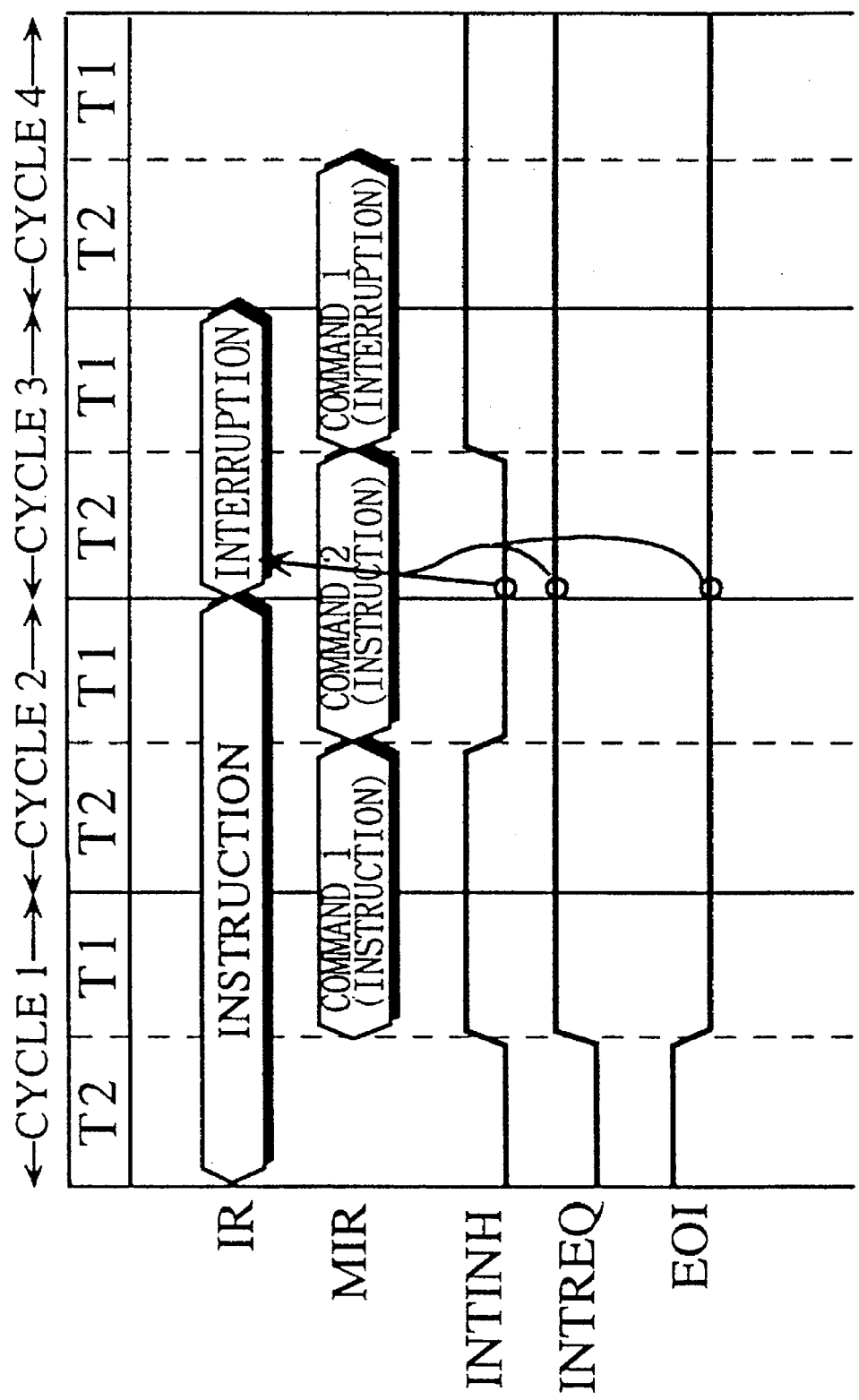
FIG. 24 comprising FIGS. 24A
FIG. 24B is a drawing showing the differences in operation, by means of the status of the trace flags of the processor status register.
Figure 24B:
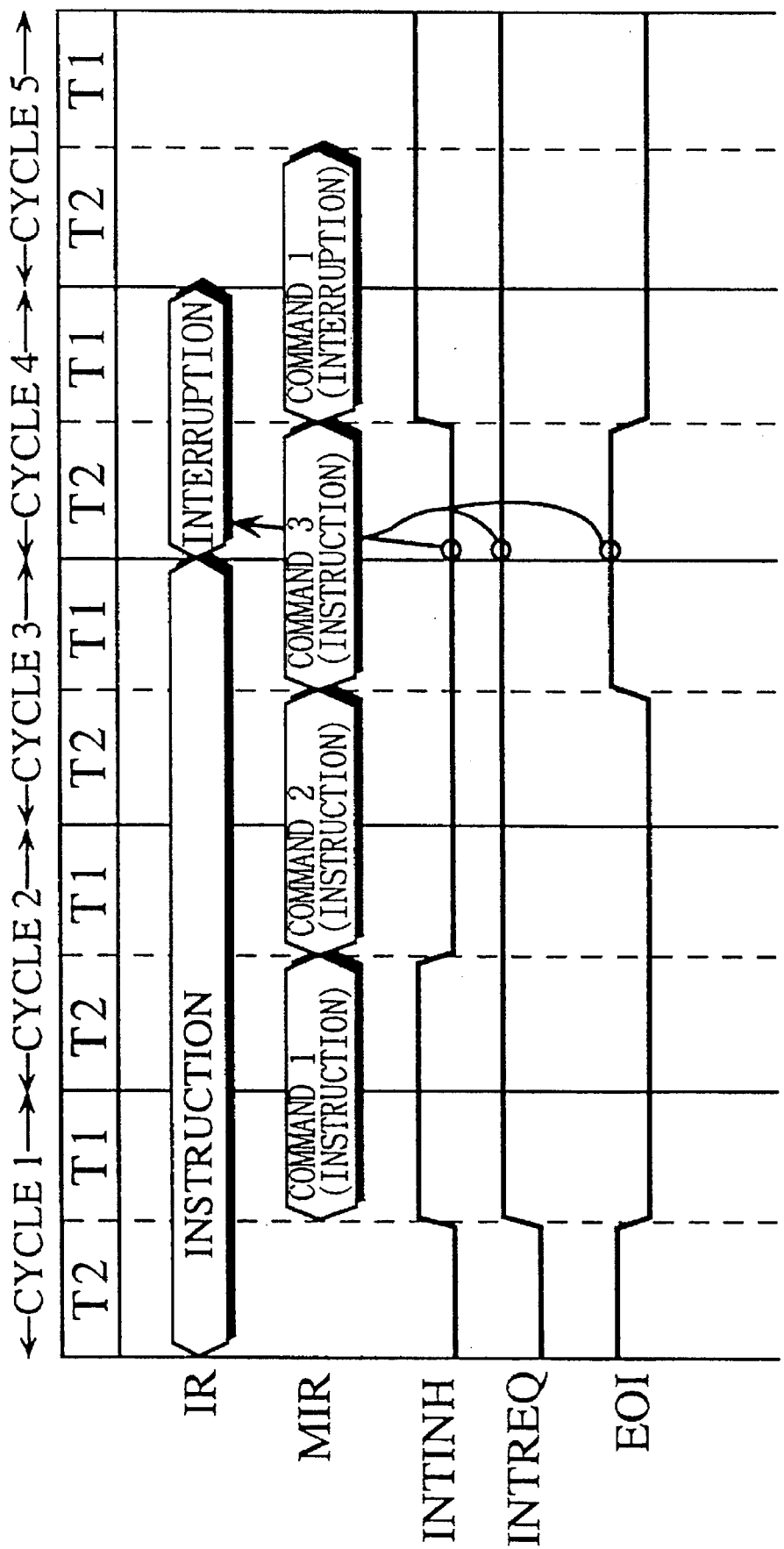

The difference in operation due to the presence of the trace flags of the processor status register is shown in FIG. 24. FIG. 24(A) is a drawing showing the operation when the trace flag becomes "1" before the execution of the instruction, while FIG. 24(B) is a drawing showing the operation when the trace flag becomes "0" before the execution of the instruction. The following is an explanation of this operation.

In FIG. 24(A),INTINH is the signal outputted from the decoder 33, and shows whether reception is possible for an interruption for every command outputted by the decoder. INTREQ is the interruption request signal. EOI is the signal showing the command outputted by the decoder at the end of an instruction. The instruction is stored in the instruction register at timing T2 in cycle 1, and the decoded result in then outputted to the microinstruction register MIR at timing T1. At this timing, the interruption request is set as being issued (INTREQ=1). Since interruption is not permitted at command 1 (INTINH=1), then in cycle 2 the decoding of the second cycle of the instruction begins, and command 2 is stored in MIR at timing T1 in cycle 2. Since interruption is permitted by command 2 (INTINH=0), then although the command 2 is not the last command in the instruction (EOI=0), the interruption request is received, and the decoding of the interruption process is begun in cycle 3.

FIG. 24(B) is a drawing showing the operation when the trace flag becomes "0" before the execution of the instruction, and is the same as FIG. 24(A) until cycle 2. Command 2 permits interruption (INTINH=0), but since the trace flag is 1, the interruption is not received in cycle 3, and the decoding of the instruction continues being executed. Command 3, which is stored in MIR at timing T1 in cycle 3, permits interruption (INTINH=0) and is also the last command in the instruction (EOI=1). When the trace flag is 1, even if there is an interruption request during a command for which interruption is possible, the interruption will not be received until the final command in the instruction has been outputted. Therefore the decoding of the interruption process will not start until cycle 4.

Figure 6:
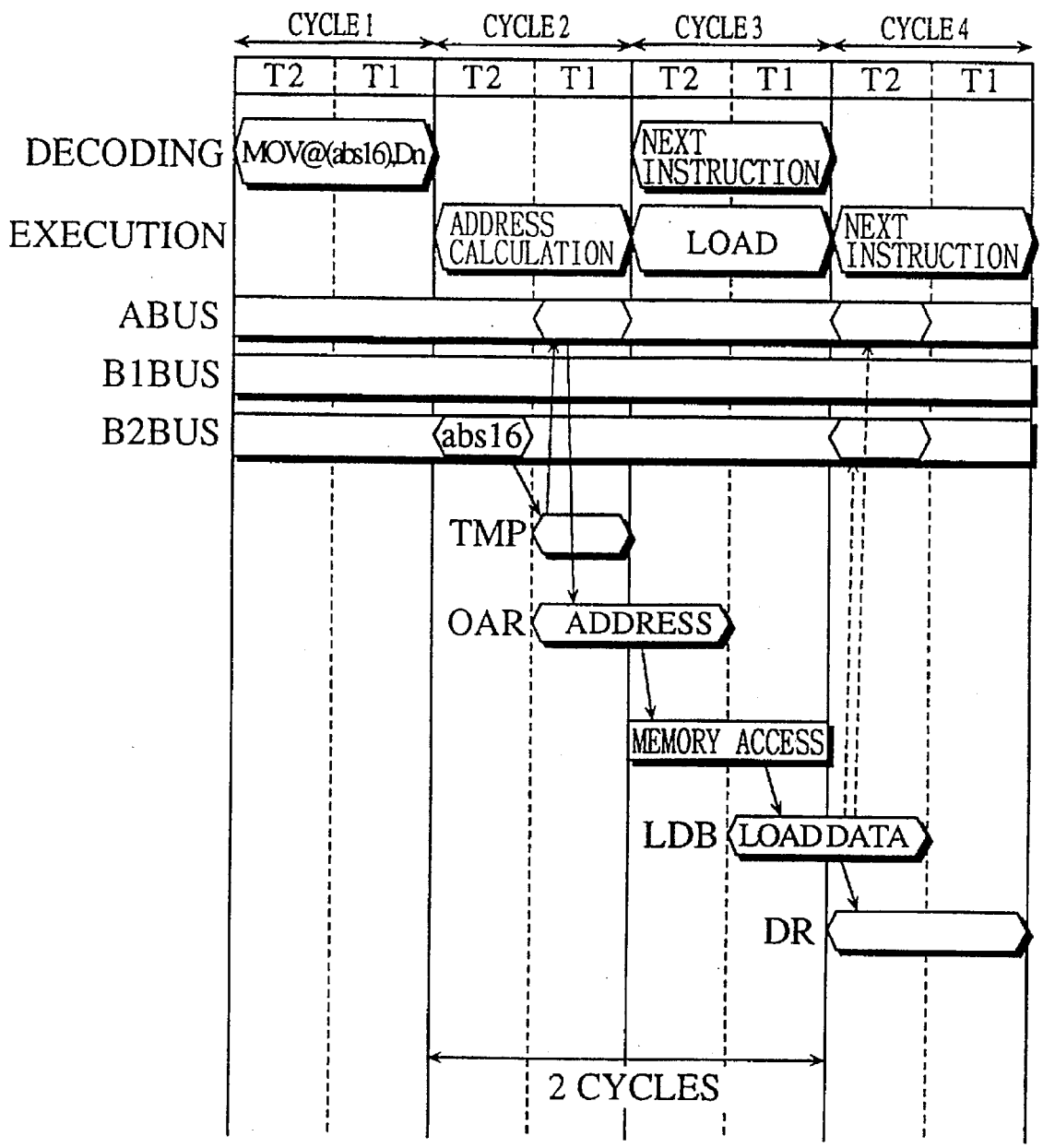
FIG. 6 is a timing chart which explains the operation when the microcomputer which is installed in the interruption processing apparatus of the present invention executes a load instruction.

Finally, the following is a detailed description of the operation of the CPU 6 with reference to FIG. 3 and FIG. 6, for when the memory and external devices are referenced by the load instruction (mov @(FCOE),AR0) for (B) the group number reading process, or a load instruction (mov @(AR0),AR0) for (C) the interruption program entry address FIG. 6 is a timing chart showing the operation when the microcomputer 7 executes a load instruction. In the same drawing, T1 and T2 are the internal clocks, with T1 and T2 together making 1 machine cycle. The headings, [decoding] and [execution] show the aspects of the pipeline during the decoding stage and the execution stage, respectively. In FIG. 6, the addressing mode of the load instruction is absolute addressing, so data is loaded into the data register (Dn) from the memory shown by the content of the absolute value of the address contained in the instruction.

Load instructions are normally executed over 2 cycles, with the address being calculated in the first cycle and memory being accessed in the second. FIG. 6 is a timing chart showing the operation of a load instruction executed over 2 cycles.

At timing T2 in the first cycle, the load instruction is loaded from the instruction buffer 32 into the signal line 301, passes through the selector 34, and is stored in the instruction register 35. The content of the instruction register 35 and the content of the status register 36 storing the decoding status are then inputted, and the instruction is decoded by the programmable logic array The decoded result is then stored in the micro instruction register 88 at timing T1 in cycle 1, and the control signal 300 is outputted. The predecoder 37 inputs the content of the instruction register 35 and the content of the status register 36, and outputs a control signal at timing T2. The control signal outputted by the predecoder is used for executing in 1 cycle the operation for a load instruction and a conditional branch instruction.

During cycle 2, the value of the 16 bit absolute address is read from the instruction buffer 32 at timing T2, and is outputted to the bus 22 via 302. The value read into the bus 22 is then selected by the selector 55 and supplied to the arithmetic logical unit 51. The data inputted into the B side of the arithmetic logical unit 51 passes through the arithmetic logical unit 51 and the shifter and is then stored in the temporary register 56. That is to say, for the calculation of the address by the arithmetic logical unit 51, the input into the B side is outputted as it is, and so is not influenced by the input into the A side. Also, shifter which is positioned directly after the arithmetic logical unit 51 also outputs its input as it is. At timing T1 in cycle 2, the content of the temporary register 56 is outputted to the ABUS 20 by means of 501, and is stored in the operand address register 53.

In cycle 3, the stored address in the operand address register 53 is selected by the selector 57, and is then transmitted to the operand address buffer 74. The bus control means 70 then decodes the address in the operand address buffer 74 and distinguishes whether the loading address is for the ROM 79, the RAM 78, or for an address external to the chip. It then controls the bus switch 77 and the external bus interface 71 based on the result of the distinguishing process and loads the data. When the access is for the ROM 79, then the address stored in the operand buffer 74 is supplied to the ROM via the bus 708 and the bus 706, and the loaded data is stored in the load buffer 76 via the bus 707 and the bus 709. When the access is for the RAM 78, then the address is supplied to the RAM via the bus 708, and the loaded data is stored in the load buffer 76 via the bus 709. When the address is for outside the chip, then the address is supplied to the memory outside the chip by the bus 708 and the bus 710, with the loaded data stored in the load buffer 76 by means of the bus 711 and the bus 709. In either case, if there is no waiting time to access the memory, then the loaded data is stored in the load buffer 76 at timing T1 in cycle 3.

At timing T2 in cycle 4, the data stored in the load buffer 76 passes through the selector 43 by means of the bus 705 and is transmitted to the data register 41. When the instruction coming directly after the load instruction uses the loaded data, then it uses the data in the load buffer 76. That is to say, the data in the load buffer 76 is outputted as direct data by the bus 705 to the ABUS 20 or the B2BUS 22 (shown in FIG. 6 by the dotted line) at timing T2 in cycle 4. Therefore, the load instruction is executed over 2 cycles.

In this embodiment of the present invention, the number of interruption groups is given as 32, but this need not be subject to such a limit. Also, the number of interruptions registered in an interruption group, the number of interruption mask levels and the number of address registers and data registers in the microcomputer are not subject to any limit. Also, for the present invention the instruction buffer in the microcomputer for the interruption method has a capacity of 3 bytes, but this, too, is not restricted to a 3 byte limit.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being include therein.

What is claimed is:

1. An interruption processing apparatus for controlling interruptions, installed in a microcomputer which contains a central processing unit (CPU) which receives a number of interruption signals, comprising:

mask level output means for outputting a mask level which shows an interruption level which can be received by the CPU;

a plurality of interruption group control means, each receiving interruptions from an input/output device (I/O) at its own predetermined level and outputting to the CPU; and interruption handler initiation means for initiating a single program starting from a fixed address which processes a transfer to an interruption signal, no matter from what interruption group control means the interruption is received, wherein every interruption group control means comprises:

an interruption control register means for storing the predetermined interruption level for a group including interruption request flags showing when each of the interruption requests in a group occurs;

interruption request means for outputting to the CPU an interruption signal corresponding to the interruption level in the interruption control register means, based on the interruption request flags;

interruption arbitration means for adjusting conflict with other interruption group control means, based on the interruption level stored in the interruption control register means and on the mask level inputted from the mask level output means; and group number output means for outputting a group number predetermined for a group responding to an access from the CPU, in accordance with an arbitration result; and wherein the program is a processing program which determines an interruption factor in a group for a interruption group control means which has outputted an interruption request.

2. The interruption processing apparatus of claim 1, further comprising:

handler storage means for storing a program which selects one interruption factor out of a group and transfers the factor to an interruption program, once an interruption signal has been inputted into the CPU and the group number has been taken from the interruption group control means which outputted the interruption signal;

wherein the interruption handler initiation means has the program with the fixed starting address executed, once the CPU has received the interruption signal.

3. The interruption processing apparatus of claim 2, wherein each interruption control register means stores enable flags showing that interruption is permitted corresponding to every interruption request flag, and every interruption request means outputs the interruption signal to the CPU when the corresponding interruption request flag and the enable flag are both valid.

4. The interruption processing apparatus of claim 3, wherein each interruption arbitration means is connected in series via arbitration signal lines, and wherein every interruption arbitration means further comprises: mask level determination means for determining whether the mask level outputted by the CPU and the interruption level of the interruption control register means are equal; and arbitration signal output means for invalidating and outputting the arbitration signal from a previous interruption arbitration means in the series, when the mask level determination means determines that the levels are equal, and for outputting an arbitration signal from a previous interruption arbitration means in the series as it is, when it is determined that the levels are not equal;

wherein the CPU outputs a group number read signal, by means of executing the program, and a first interruption arbitration beans in the series receives the group number read signal from the CPU as the arbitration signal.

5. The interruption processing apparatus of claim 4, wherein every group number output means comprises:

group number register means for storing the predetermined group number for a group; and group number output means for outputting the group number stored in the group number register means to the CPU, when the arbitration signal outputted by the arbitration signal output means in the group is valid.

6. The interruption processing apparatus of claim 2, wherein for one of the interruption group control means, the interruption request means outputs the interruption signal to the CPU regardless of the arbitration result, when any one of the interruption request flags in the interruption control register is set.

7. The interruption processing apparatus of claim 6, wherein every interruption control register means stores enable flags showing that interruption is permitted corresponding to every interruption request flag, and every interruption request means outputs the interruption signal to the CPU when the corresponding interruption request flag and the enable flag are both valid.

8. The interruption processing apparatus of claim 7, wherein every interruption arbitration means is connected in series via arbitration signal lines, and wherein every interruption arbitration means further comprises:

mask level determination means for determining whether the mask level outputted by the CPU and the interruption level of the interruption control register means are equal; and arbitration signal output means for invalidating and outputting the arbitration signal from a previous interruption arbitration means in the series, when the mask level determination means determines that the levels are equal, and for outputting an arbitration signal from a previous interruption arbitration means in the series as it is, when it is determined that the levels are not equal;

wherein the CPU outputs a group number read signal, by means of executing the program, and a first interruption arbitration means in the series receives the group number read signal from the CPU as the arbitration signal.

9. The interruption processing apparatus of claim 8, wherein every group number output means comprises:

a group number register means for storing the predetermined group number for a group; and group number output means for outputting the group number stored in the group number register means to the CPU, when the arbitration signal outputted by the arbitration signal output means in the group is valid.

10. The interruption processing apparatus of claim 2, further comprising:

a first terminal means for outputting a mask level from the mask level output means; and a second terminal means for outputting an arbitration result of the interruption arbitration means in an interruption group control means which is assigned a lowest interruption level, out of the interruption group control means which are inside the microcomputer;

wherein the first terminal means and the second terminal means are connected to at least one interruption group control means external to the microcomputer having a same construction as the interruption group control means.

11. The interruption processing apparatus of claim 10, wherein every interruption control register means stores enable flags showing that interruption is permitted corresponding to every interruption request flag, and every interruption request means outputs the interruption signal to the CPU when the corresponding interruption request flag and the enable flag are both valid.

12. The interruption processing apparatus of claim 11, wherein every interruption arbitration means is connected in series via arbitration signal lines, and wherein every interruption arbitration means further comprises:

mask level determination means for determining whether the mask level outputted by the CPU and the interruption level of the interruption control register means are equal; and arbitration signal output means for invalidating and outputting the arbitration signal from a previous interruption arbitration means in the series, when the mask level determination means determines that the levels are equal, and for outputting an arbitration signal from a previous interruption arbitration means in the series as it is, when it is determined that the levels are not equal;

wherein the CPU outputs a group number read signal, by means of executing the program, and a first interruption arbitration means in the series receives the group number read signal from the CPU as the arbitration signal.

13. The interruption processing apparatus of claim 12, wherein every group number output means comprises:

a group number register means for storing the predetermined group number for a group; and group number output means for outputting the group number stored in the group number register means to the CPU, when the arbitration signal outputted by the arbitration signal output means in the group is valid.

14. The interruption processing apparatus of claim 2, wherein every interruption group control means further comprises:

noise elimination means for eliminating an interruption occurrence signal which notifies that an interruption has occurred, if it is shorter than a predetermined time; and selection means for selecting one of the output of the noise elimination means and the interruption occurrence signal and outputting to the interruption request flag in the interruption control register means.

15. The interruption processing apparatus of claim 14, wherein the selection means selects the output of the noise elimination means when an operation clock of the CPU is not stopped, and selects the interruption occurrence signal when the operation clock of the CPU is stopped.

16. The interruption processing apparatus of claim 15, wherein every interruption control register means stores enable flags showing that interruption is permitted corresponding to every interruption request flag, and every interruption request means outputs the interruption signal to the CPU when the corresponding interruption request flag and the enable flag are both valid.

17. The interruption processing apparatus of claim 16, wherein every interruption arbitration means is connected in series via arbitration signal lines, and wherein every interruption arbitration means further comprises:

mask level determination means for determining whether the mask level outputted by the CPU and the interruption level of the interruption control register means are equal; and arbitration signal output means for invalidating and outputting the arbitration signal from a previous interruption arbitration means in the series, when the mask level determination means determines that the levels are equal, and for outputting an arbitration signal from a previous interruption arbitration means in the series as it is, when it is determined that the levels are not equal;

wherein the CPU outputs a group number read signal, by means of executing the program, and a first interruption arbitration means in the series receives the group number read signal from the CPU as the arbitration signal.

18. The interruption processing apparatus of claim .17, wherein every group number output means comprises:

a group number register means for storing the predetermined group number for a group; and group number output means for outputting the group number stored in the group number register means to the CPU, when the arbitration signal outputted by the arbitration signal output means in the group is valid.

19. The interruption processing apparatus of claim 2, further comprising:

pointer storage means for storing a pointer which shows a prefetch position of an instruction when an interruption is received;

prefetched amount storage means for storing the amount of instructions prefetched when an interruption is received; and address calculation initiation means for initiating the microprogram for calculating a return address for a return from an interruption program, based on prefetch position of the pointer storage means and the prefetched amount in the prefetched amount storage means.

20. The interruption processing apparatus of claim 19, wherein every interruption control register means stores enable flags showing that interruption is permitted corresponding to every interruption request flag, and every interruption request means outputs the interruption signal to the CPU when the corresponding interruption request flag and the enable flag are both valid.

21. The interruption processing apparatus of claim 20, wherein every interruption arbitration means is connected in series via arbitration signal lines, and wherein every interruption arbitration means further comprises:

mask level determination means for determining whether the mask level outputted by the CPU and the interruption level of the interruption control register are equal; and arbitration signal output means for invalidating and outputting the arbitration signal from a previous interruption arbitration means in the series, when the mask level determination means determines that the levels are equal, and for outputting an arbitration signal from a previous interruption arbitration means in the series as it is, when it is determined that the levels are not equal;

wherein the CPU outputs a group number read signal, by means of executing the program, and a first interruption arbitration means in the series receives the group number read signal from the CPU as the arbitration signal.

22. The interruption processing apparatus of claim wherein every group number output means comprises:

a group number register means for storing the predetermined group number for a group; and group number output means for outputting the group number stored in the group number register to the CPU, when the arbitration signal outputted by the arbitration signal output means in the group is valid.

23. The interruption processing apparatus of claim 2, further comprising:

execution status holding means for holding information showing an end of an execution of an instruction and a decoding position of an instruction; and interruption permission means for showing a reception permission status of an interruption for every clock cycle corresponding to the decoding position during the execution of the instruction;

wherein the interruption processing apparatus receives the interruption at a point in time at which an interruption is permitted by the interruption permission means, even when the information held by the execution status holding means does not show that the instruction has ended.

24. The interruption processing apparatus of claim 23, wherein every interruption control register means stores enable flags showing that interruption is permitted corresponding to every interruption request flag, and every interruption request means outputs the interruption signal to the CPU when the corresponding interruption request flag and the enable flag are both valid.

25. The interruption processing apparatus of claim 24, wherein every interruption arbitration means is connected in series via arbitration signal lines, and wherein every interruption arbitration means further comprises:

mask level determination means for determining whether the mask level outputted by the CPU and the interruption level of the interruption control register means are equal; and arbitration signal output means for invalidating and outputting the arbitration signal from a previous interruption arbitration means in the series, when the mask level determination means determines that the levels are equal, and for outputting an arbitration signal from a previous interruption arbitration means in the series as it is, when it is determined that the levels are not equal;

wherein the CPU outputs a group number read signal, by means of executing the program, and a first interruption arbitration means in the series receives the group number read signal from the CPU as the arbitration signal.

26. The interruption processing apparatus of claim 25, wherein every group number output means comprises:

a group number register means for storing the predetermined group number for a group; and group number output means for outputting the group number stored in the group number register to the CPU, when the arbitration signal outputted by the arbitration signal output means in the group is valid.

27. The interruption processing apparatus of claim 2, further comprising:

flag storage means for storing a single step flag showing an execution of one instruction at a time; and single step interruption request means for outputting an interruption request at an execution of each instruction, when the single step flag is set;

wherein the interruption processing apparatus does not receive the interruption during the execution of an instruction, when there is a single step flag interruption request.

28. The interruption processing apparatus of claim 27, wherein every interruption control register means stores enable flags showing that interruption is permitted corresponding to every interruption request flag, and every interruption request means outputs the interruption signal to the CPU when the corresponding interruption request flag and the enable flag are both valid.

29. The interruption processing apparatus of claim 28, wherein every interruption arbitration means is connected in series via arbitration signal lines, and wherein every interruption arbitration means further comprises:

mask level determination means for determining whether the mask level outputted by the CPU and the interruption level of the interruption control register means are equal; and arbitration signal output means for invalidating and outputting the arbitration signal from a previous interruption arbitration means in the series, when the mask level determination means determines that the levels are equal, and for outputting an arbitration signal from a previous interruption arbitration means in the series as it is, when it is determined that the levels are not equal; wherein the CPU outputs a group number read signal, by means of executing the program, and a first interruption arbitration means in the series receives the group number read signal from the CPU as the arbitration signal.

30. The interruption processing apparatus of claim 29, wherein every group number output means comprises:

a group number register means for storing the predetermined group number for a group; and group number output means for outputting the group number stored in the group number register to the CPU, when the arbitration signal outputted by the arbitration signal output means in the group is valid.

31. An interruption processing apparatus for controlling interruptions, installed in a microcomputer which contains a central processing unit (CPU) which receives a number of interruption signals, comprising:

a plurality of interruption group control means, each receiving interruptions from an input/output device (I/O) at its own predetermined level and outputting to the CPU; and interruption handler initiation means for initiating a single program starting from a fixed address which processes a transfer to an interruption signal, no matter from what interruption group control means the interruption is received, wherein each interruption group control means comprises:

an interruption control register means for storing the predetermined interruption level for a group including interruption request flags showing when each of the interruption requests in a group occurs;

interruption request means for outputting to the CPU an interruption signal corresponding to the interruption level in the interruption control register means, based on the interruption request flags;

interruption arbitration means for adjusting conflict with other interruption group control means, based on the interruption level stored in the interruption control register means and on a mask level inputted from the CPU; and group number output means for outputting a group number predetermined for a group responding to an access from the CPU, in accordance with an arbitration result; and wherein the program is a processing program which determines an interruption factor in a group for a interruption group control means which has outputted an interruption request.

32. The interruption processing apparatus of claim 31, further comprising:

handler storage means for storing a program which selects one interruption factor out of a group and transfers the factor to an interruption program, once an interruption signal has been inputted into the CPU and the group number has been taken from the interruption group control means which outputted the interruption signal;

wherein the interruption handler initiation means has the program with the fixed starting address executed, once the CPU has received the interruption signal.

33. The interruption processing apparatus of claim 32, wherein each interruption control register means stores enable flags showing that interruption is permitted corresponding to every interruption request flag, and every interruption request means outputs the interruption signal to the CPU when the corresponding interruption request flag and the enable flag are both valid.

34. The interruption processing apparatus of claim 33, wherein each interruption arbitration means is connected in series via arbitration signal lines, and wherein every interruption arbitration means further comprises:

mask level determination means for determining whether the mask level outputted by the CPU and the interruption level of the interruption control register means are equal; and arbitration signal output means for invalidating and outputting the arbitration signal from a previous interruption arbitration means in the series, when the mask level determination means determines that the levels are equal, and for outputting an arbitration signal from a previous interruption arbitration means in the series as it is, when it is determined that the levels are not equal;

wherein the CPU outputs a group number read signal, by means of executing the program, and a first interruption arbitration beans in the series receives the group number read signal from the CPU as the arbitration signal.

35. The interruption processing apparatus of claim 34, wherein every group number output means comprises:

group number register means for storing the predetermined group number for a group; and group number output means for outputting the group number stored in the group number register means to the CPU, when the arbitration signal outputted by the arbitration signal output means in the group is valid.

36. An interruption transmission and prioritizing system comprising:

a central processing unit (CPU) adapted to receive interruption requests and to process said requests, said CPU comprising means for outputting a masking level corresponding to a current priority level for receiving interruption requests; and a single processing program means for processing each interruption request regardless of which input/output device submitted said request;

a plurality of interruption control units, each interruption control unit having a pre-assigned priority and each interruption control unit connected to a plurality of I/O devices and adapted to receive interruption requests from said I/O devices, said interruption control units including means for storing said interruption requests from said I/O devices and means for transmitting a group interruption request to said CPU; and a plurality of interruption level arbitration means, each communicating with said CPU to receive said masking level and communicating with one of said interruption control units for judging whether said pre-assigned priority of said interruption control unit is higher that said masking level, and preventing said interruption control unit from transmitting said group interruption request to said CPU when said pre-assigned priority is lower than said masking level.

37. The interruption transmission and prioritizing system as recited in claim 36 wherein each of said I/O devices contains a priority assignment, and where said interruption level arbitration means further judges said priority assignments of said I/O devices when said I/O device submits an interruption request, and prevents said interruption control unit from transmitting said group interruption request to said CPU when said priority assignment of said I/O device is lower than said masking level.

38. The interruption transmission and prioritizing system as recited in claim 37 wherein at least one interruption control unit and the CPU is located on a microcomputer.

39. The interruption transmission and prioritizing system as recited in claim 38 wherein at least one interruption control unit is external to said microcomputer.

40. The interruption transmission and prioritizing system as recited in claim 39 wherein said CPU further comprises means for receiving group interruption requests and determining which I/O device within said group issued said request, and for communicating to said single processing program means the identity of said I/O device.

* * * * *